United States Patent
Takahashi et al.

(10) Patent No.: US 12,238,601 B2
(45) Date of Patent: *Feb. 25, 2025

(54) USER DEVICE AND BASE STATION APPARATUS

(71) Applicant: NTT DOCOMO, INC., Tokyo (JP)

(72) Inventors: Hideaki Takahashi, Tokyo (JP); Tianyang Min, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 393 days.

This patent is subject to a terminal disclaimer.

(21) Appl. No.: 17/426,425

(22) PCT Filed: Feb. 14, 2019

(86) PCT No.: PCT/JP2019/005413
§ 371 (c)(1),
(2) Date: Jul. 28, 2021

(87) PCT Pub. No.: WO2020/166020
PCT Pub. Date: Aug. 20, 2020

(65) Prior Publication Data
US 2022/0104098 A1    Mar. 31, 2022

(51) Int. Cl.
*H04W 36/00* (2009.01)
*H04W 36/30* (2009.01)

(52) U.S. Cl.
CPC ..... *H04W 36/305* (2018.08); *H04W 36/0058* (2018.08); *H04W 36/00698* (2023.05); *H04W 36/0022* (2013.01)

(58) Field of Classification Search
CPC ......... H04W 36/0005; H04W 36/0022; H04W 36/00222; H04W 36/0055;
(Continued)

(56) References Cited

U.S. PATENT DOCUMENTS

2016/0286449 A1* 9/2016 Choi .................. H04W 36/18
2018/0124648 A1    5/2018 Park et al.
(Continued)

FOREIGN PATENT DOCUMENTS

WO    2018/128572 A1    7/2018

OTHER PUBLICATIONS

International Search Report issued in PCT/JP2019/005413 on Mar. 26, 2019 (5 pages).
(Continued)

*Primary Examiner* — Matthew W Genack
(74) *Attorney, Agent, or Firm* — Osha Bergman Watanabe & Burton LLP

(57) ABSTRACT

A user device comprises a communication unit configured to perform communication to which dual connectivity is applied, wherein a master cell group and a secondary cell group are configured in the dual connectivity, a control unit configured to detect occurrence of a failure in the master cell group, and a transmission unit configured to transmit information related to the occurrence of the failure in the master cell group to a master node of the master cell group, wherein the control unit changes a primary cell to another cell by performing handover to a different RAT (Radio Access Technology).

5 Claims, 22 Drawing Sheets

(58) Field of Classification Search
CPC ......... H04W 36/0058; H04W 36/0061; H04W 36/0069; H04W 36/00692; H04W 36/00698; H04W 36/0083; H04W 36/30; H04W 36/305

See application file for complete search history.

(56) References Cited

U.S. PATENT DOCUMENTS

| | | | |
|---|---|---|---|
| 2018/0124650 A1 | 5/2018 | Park et al. | |
| 2019/0289510 A1* | 9/2019 | Rugeland | H04W 36/0079 |
| 2020/0059395 A1* | 2/2020 | Chen | H04W 28/082 |

OTHER PUBLICATIONS

Written Opinion of the International Searching Authority issued in PCT/JP2019/005413 on Mar. 26, 2019 (4 pages).

3GPP TS 38.300 V15.4.0; "3rd Generation Partnership Project; Technical Specification Group Radio Access Network; NR; NR and NG-RAN Overall Description; Stage 2 (Release 15)"; Dec. 2018 (97 pages).

3GPP TS 37.340 V15.4.0; "3rd Generation Partnership Project; Technical Specification Group Radio Access Network; Evolved Universal Terrestrial Radio Access (E-UTRA) and NR; Multi-connectivity; Stage 2 (Release 15)"; Dec. 2018 (67 pages).

Office Action issued in Chinese Application No. 201980091517.7, mailed on Nov. 28, 2023 (12 pages).

Huawei, HiSilicon; "Handling on MN failure and SN failure for LTE NR tight interworking"; 3GPP TSG-RAN WG2 Meeting #97bis, R2-1703655; Spokane, USA; Apr. 3-7, 2017 (4 pages).

3GPP TS 36.331 V14.0; 3rd Generation Partnership Project "36331-e10", Section 5.3.11.3 (Release 14); Dec. 2016 (4 pages).

Office Action issued in counterpart Chinese Application No. 201980091517.7, mailed May 12, 2024 (45 pages).

Intel Corporation; "Stage 3 details on inter RAT HO between NR and (e)LTE"; 3GPP TSG RAN WGZ Meeting NR Adhoc 1807, R2-1809775; Montreal, Canada, Jul. 2-6, 2018 (17 pages)

Ericsson: "MCG failure handling in case of NE-DC and NN-DC (TP to 37.340)"; 3GPP TSG-RAN WG2 #103, R2-1812017; Gothenburg, Sweden, Aug. 20-24, 2018 (5 pages).

Office Action issued in Chinese Application No. 201980091517.7, mailed on Sep. 25, 2024 (18 pages).

* cited by examiner

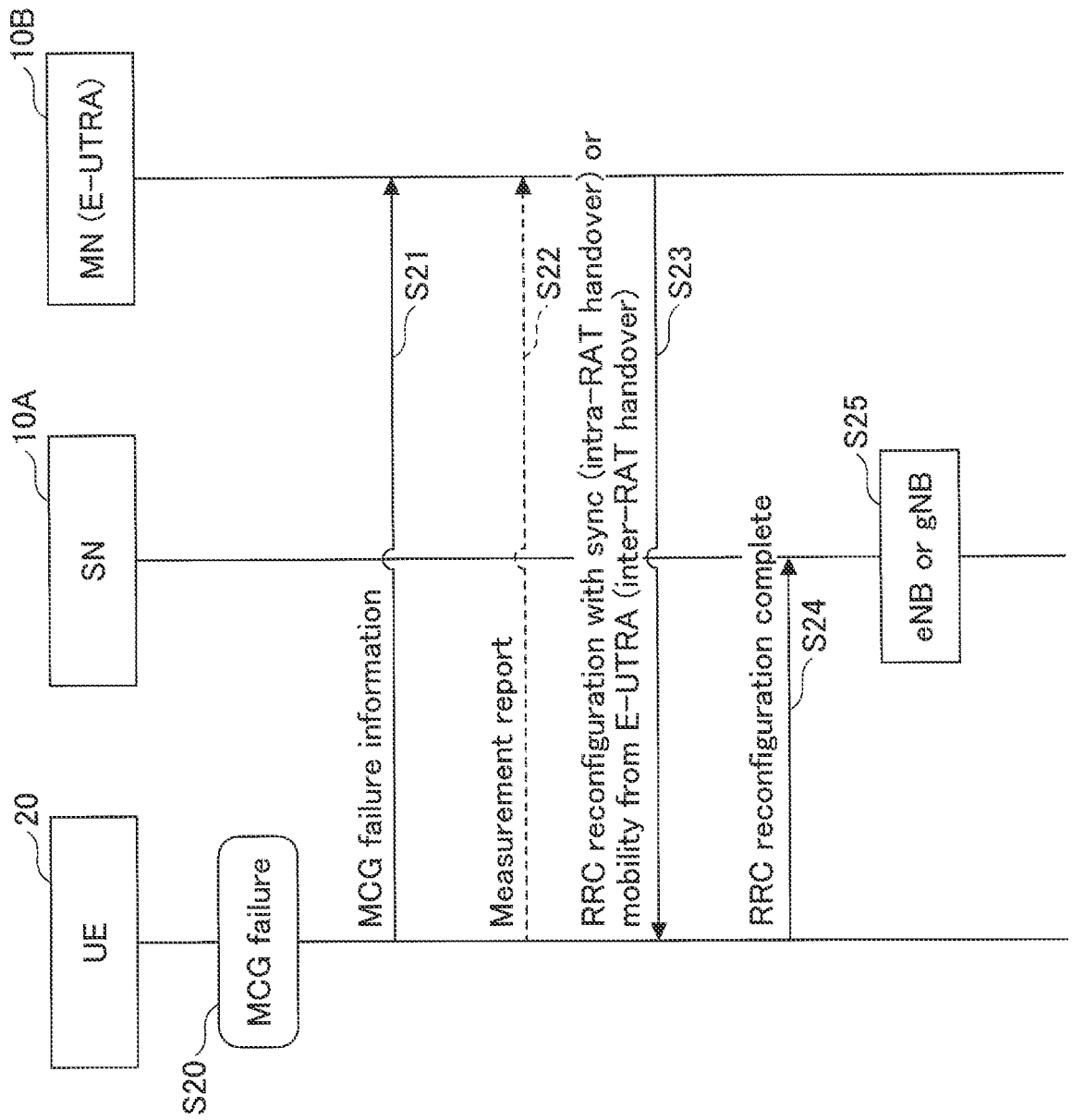

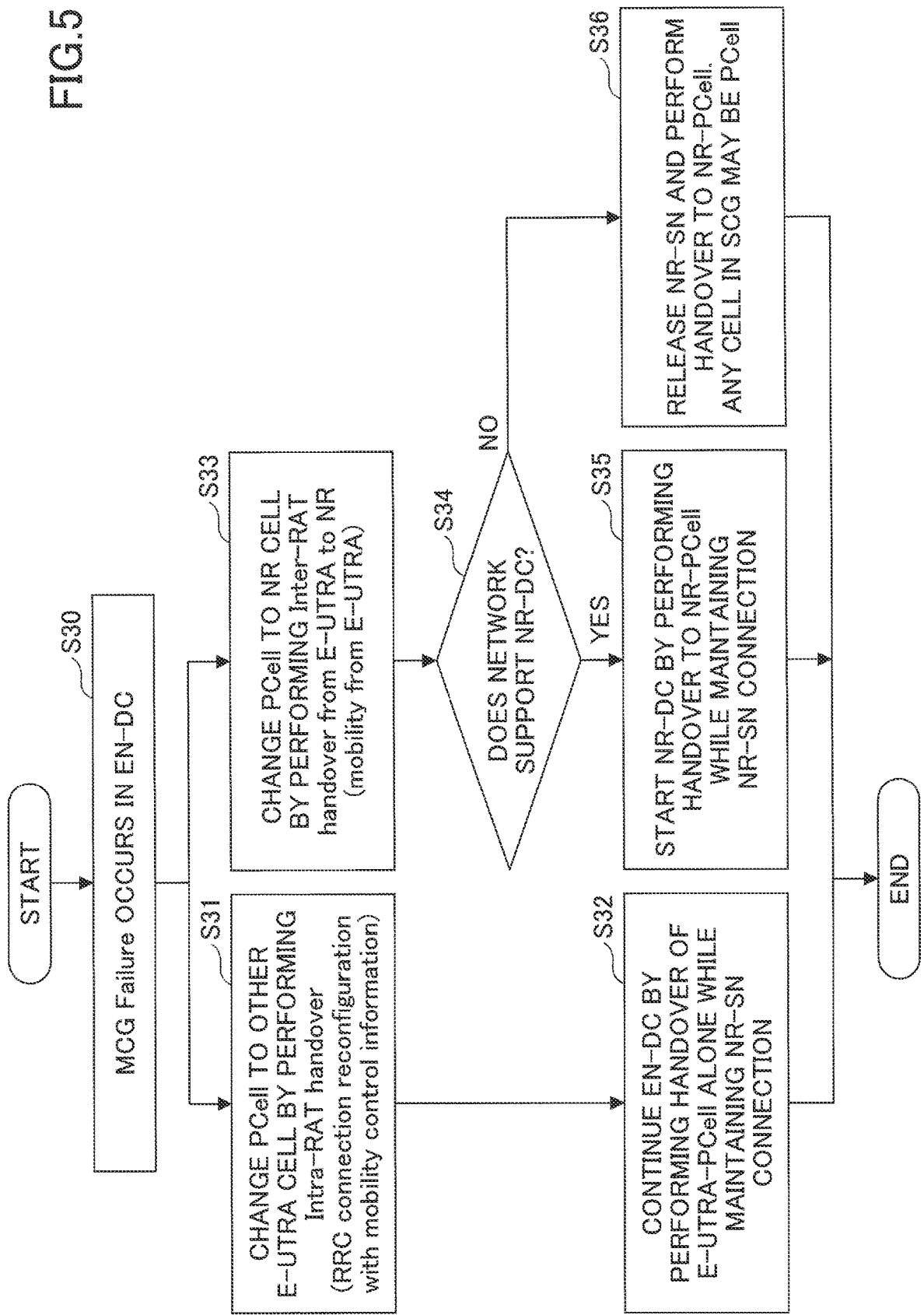

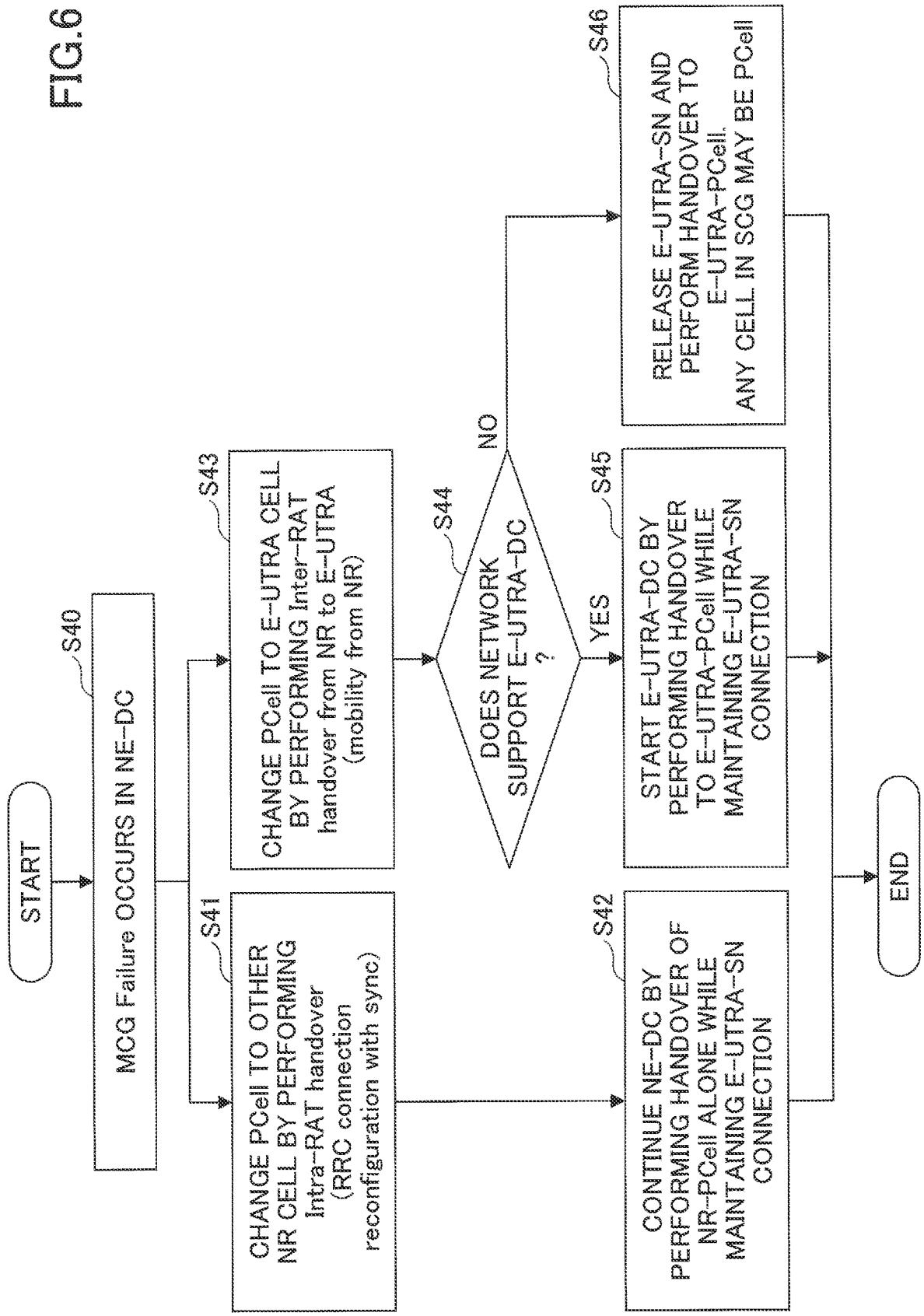

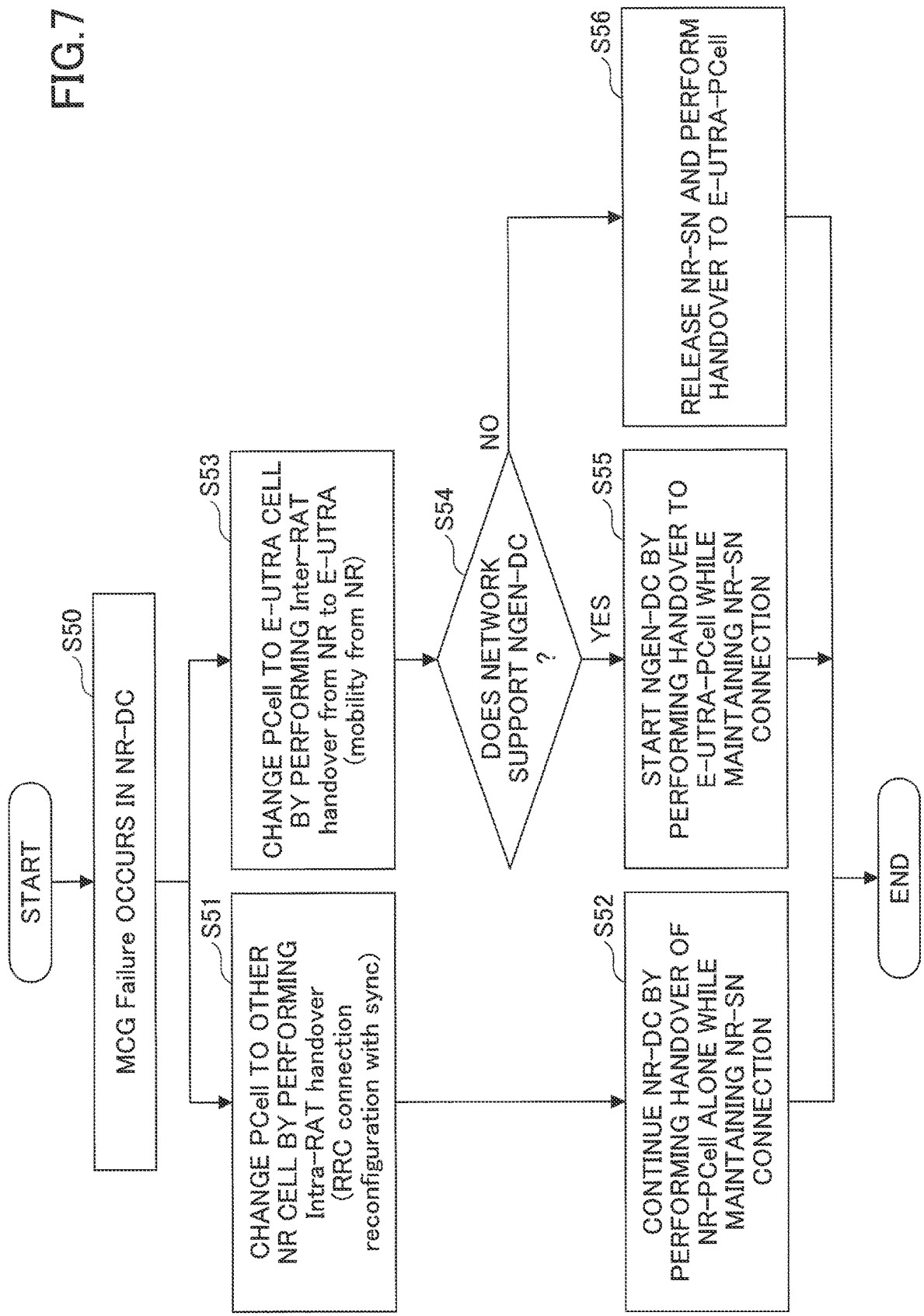

FIG.8

7.7 SCG/MCG failure handling

RLF is declared separately for the MCG and for the SCG.

If radio link failure is detected for MCG, the UE initiates the RRC connection re-establishment procedure, except for the case where a UE capable of fast recovery functionality is configured with MR-DC.

[...]

The following MCG failure cases are supported while the UE is configured with MR-DC:

- MCG RLF;
- Re-configuration with sync failure of MCG;
- Mobility from NR failure;
- RRC connection reconfiguration failure (on SRB1);
- Integrity check failure on SRB1 or SRB2.

For the UE capable of the fast recovery functionality, upon MCG failure, the UE suspends MCG transmissions for all radio bearers and reports the MCG Failure Information to the MN via SCG leg of SRB1 if split SRB is applied for SRB1 (no matter if SRB3 is configured), instead of triggering re-establishment. If split SRB is not applied for SRB1 but SRB3 is configured, the UE reports the MCG Failure Information to the SN via SRB3. In this case, the SN forwards the MCG Failure Information to the MN.

In all MCG failure cases, the fast recovery capable UE maintains the current measurement configurations from both the MN and the SN and the UE continues measurements based on configuration from the MN and the SN if possible. The MN measurements configured to be routed via the SN will continue to be reported after the SCG failure.

The UE includes in the *MCG Failure Information* message the measurement results available according to current measurement configuration of both the MN and the SN. The MN handles the *MCG Failure Information* message and may decide to keep the MCG, or to change MN/MCG by intra or inter-RAT handover within the same RAT or to the other RAT as illustrated in Figure 7.7-1 in case of EN-DC. The target cell/node can be a PCell in eNB/gNB which was configured as SN for the UE as illustrated in Figure 7.7-2. In all the cases, the measurement results according to the MN configuration and the MCG failure type may be forwarded to the old MN and/or to the new MN.

Upon MCG failure, if SCG failure is occurred and MCG has not been recovered (or re-established) yet, the fast recovery capable UE initiates the RRC connection re-establishment procedure.

FIG. 10

5.6.2X.2 Initiation

A UE configured with (NG)EN-DC initiates the procedure to report MCG failures when MCG transmission is not suspended and when one of the following conditions is met:

1> upon detecting radio link failure for the MCG, in accordance with 5.3.11; or
1> upon handover failure, in accordance with 5.3.5.6; or
1> upon mobility from E-UTRA failure, in accordance with 5.4.3.5; or
1> except for UP-EDT, upon integrity check failure indication from lower layers concerning SRB1 or SRB2; or
1> upon an (E-UTRA) RRC connection reconfiguration failure, in accordance with 5.3.5.5; or
1> upon an NR RRC reconfiguration failure, in accordance with TS38.331 [82], clause 5.3.5.5.

Upon initiating the procedure, the UE shall:

1> stop timers T310, T312, T313, T307 and T370, if running;
1> suspend MCG transmission for all SRBs and DRBs;
1> reset MCG-MAC;

1> release the MCG SCell(s), if configured, in accordance with 5.3.10.3a;
1> apply the default physical channel configuration to MCG as specified in 9.2.4;
1> apply the default semi-persistent scheduling configuration to MCG as specified in 9.2.3;
1> apply the default MAC main configuration to MCG as specified in 9.2.2;
1> release *idc-Config*, if configured;

1> initiate transmission of the *MCGFailureInformation* message in accordance with 5.6.2X.3.

FIG. 11

5.6.2X.3   Actions related to transmission of *MCGFailureInformation* message

The UE shall set the contents of the *MCGFailureInformation* message as follows:
1>   include *failureType* within *failureReportMCG* and set it to indicate the MCG failure in accordance with 5.6.2X.4;
1>   set the *measResultServFreqListExt* to include for each E-UTRA SCG cell that is configured, if any, within *measResultServCell* the quantities of the concerned serving cells, if available according to performance requirements in TS 36.133 [16];
1>   for each E-UTRA SCG serving frequency included in *measResultServFreqListExt*, include within *measResultBestNeighCell* the *physCellId* and the quantities of the best non-serving cell, based on RSRP, on the concerned serving frequency;
1>   set the *measResultNeighCells* to include the best measured cells on non-serving E-UTRA frequencies, ordered such that the best cell is listed first, and based on measurements collected up to the moment the UE detected the failure, and set its fields as follows;
   2>   if the UE was configured to perform measurements for one or more non-serving EUTRA frequencies and measurement results are available, include the *measResultListEUTRA*;
   2>   for each neighbour cell included, include the optional fields that are available;

The UE shall submit the *MCGFailureInformation* message to lower layers for transmission.

FIG. 12

5.6.2X.4  Failure type determination

The UE shall set the MCG failure type as follows:

1> if the UE initiates transmission of the *MCGFailureInformation* message due to T310 expiry:
  2> set the *failureType* to *t310-Expiry*;
1> else if the UE initiates transmission of the *MCGFailureInformation* message to provide random access problem indication from MCG MAC:
  2> set the *failureType* to *randomAccessProblem*;
1> else if the UE initiates transmission of the *MCGFailureInformation* message to provide indication from MCG RLC that the maximum number of retransmissions has been reached:
  2> set the *failureType* to *rlc-MaxNumRetx*;
1> else if the UE initiates transmission of the *MCGFailureInformation* message due to T312 expiry:
  2> set the *failureType* to *t312-Expirty*;
1> else if the UE initiates transmission of the *MCGFailureInformation* message due to Reconfiguration failure of NR RRC reconfiguration message:
  2> set the *failureType* to *reconfigurationFailureNR*;
1> else if the UE initiates transmission of the *MCGFailureInformation* message due to Reconfiguration failure of E-UTRA RRC connection reconfiguration message:
  2> set the *failureType* to *reconfigurationFailureEUTRA*;
1> else if the UE initiates transmission of the *MCGFailureInformation* message due to the handover failure:
  2> set the *failureType* to *handoverFailure*;
1> else if the UE initiates transmission of the *MCGFailureInformation* message due to the mobility from E-UTRA failure:
  2> set the *failureType* to *mobilityFromEUTRA-Failure*;
1> else if the UE initiates transmission of the *MCGFailureInformation* message to provide indication of intergirty check failure:
  2> set the *failureType* to *integrityFailure*.

FIG. 13

– *MCGFailureInformation*

The *MCGFailureInformation* message is used to provide information regarding E-UTRA MCG failures detected by the UE configured with (NG)EN-DC.
    Signalling radio bearer: SRB1
    RLC-SAP: AM
    Logical channel: DCCH
    Direction: UE to E-UTRAN

*MCGFailureInformation* message

```
-- ASN1START

MCGFailureInformation-r16 ::=       SEQUENCE {
    criticalExtensions                  CHOICE {
        c1                                  CHOICE {
            mcgFailureInformation-r16           MCGFailureInformation-r16-IEs,
            spare3 NULL, spare2 NULL, spare1 NULL
        },
        criticalExtensionsFuture            SEQUENCE {}
    }
}

MCGFailureInformation-r16-IEs ::=   SEQUENCE {
    failureReportMCG-r16                FailureReportMCG-r16                OPTIONAL,
    nonCriticalExtension                SEQUENCE {}                         OPTIONAL
}

FailureReportMCG-r16 ::=            SEQUENCE {
    failureType-r16                     ENUMERATED {t310-Expiry, randomAccessProblem,
                                            rlc-MaxNumRetx, t312-Expirty,
                                            reconfigurationFailureEUTRA, handoverFailure,
                                            mobilityFromEUTRA-Failure, integrityFailure,
                                            reconfigurationFailureNR, spare7,
                                            spare6, spare5, spare4, spare3, spare2, spare1},
    measResultServFreqList-r16          MeasResultServFreqListExt-r16       OPTIONAL,
    measResultNeighCells-r16            MeasResultList2EUTRA-r16            OPTIONAL
    ...
}

-- ASN1STOP
```

FIG.15

5.7.X.2  Initiation

A UE configured with NE-DC or NR-DC initiates the procedure to report MCG failures when MCG transmission is not suspended and when one of the following conditions is met:

1> upon detecting radio link failure for the MCG, in accordance with subclause 5.3.10; or
1> upon re-configuration with sync failure of the MCG, in accordance with sub-clause 5.3.5.8.3; or
1> upon mobility from NR failure, in accordance with sub-clause 5.4.3.5; or
1> upon integrity check failure indication from lower layers concerning SRB1 or SRB2; or
1> upon an (NR) RRC connection reconfiguration failure, in accordance with sub-clause 5.3.5.8.2; or
1> upon an E-UTRA RRC connection reconfiguration failure, in accordance with TS 36.331 [10], clause 5.3.5.5.

Upon initiating the procedure, the UE shall:

1> stop timers T310 and T304, if running;
1> suspend MCG transmission for all SRBs and DRBs;
1> reset MCG-MAC;

```
1> release the MCG SCell(s), if configured;
1> release the current dedicated ServingCell configuration;
1> release delayBudgetReportingConfig, if configured, and stop timer T342, if running;
1> release overheatingAssistanceConfig, if configured and stop timer T345, if running;
```

1> initiate transmission of the *MCGFailureInformation* message in accordance with 5.7.X.3.

FIG. 16

**5.7.X.3  Actions related to transmission of *MCGFailureInformation* message**

The UE shall set the contents of the MCGFailureInformation message as follows:

1> include *failureType* within *failureReportMCG* and set it to indicate the MCG failure in accordance with 5.7.X.4;
1> include and set *measResultMCG* in accordance with 5.7.3.4;
1> for each NR frequency the UE is configured to measure by *measConfig* for which measurement results are available:
   2> set the *measResultFreqListNR* to include the best measured cells, ordered such that the best cell is listed first using RSRP to order if RSRP measurement results are available for cells on this frequency, otherwise using RSRQ to order if RSRQ measurement results are available for cells on this frequency, otherwise using SINR to order, and based on measurements collected up to the moment the UE detected the failure, and for each cell that is included, include the optional fields that are available;

The UE shall submit the MCGFailureInformation message to lower layers for transmission.

FIG. 17

5.7.X.4 Failure type determination

The UE shall set the MCG failure type as follows:

1> if the UE initiates transmission of the *MCGFailureInformation* message due to T310 expiry:
   2> set the *failureType* to *t310-Expiry*;
1> else if the UE initiates transmission of the *MCGFailureInformation* message to provide random access problem indication from MCG MAC:
   2> set the *failureType* to *randomAccessProblem*;
1> else if the UE initiates transmission of the *MCGFailureInformation* message to provide indication from MCG RLC that the maximum number of retransmissions has been reached:
   2> set the *failureType* to *rlc-MaxNumRetx*;
1> else if the UE initiates transmission of the *MCGFailureInformation* message due to Reconfiguration failure of NR RRC reconfiguration message:
   2> set the *failureType* to *reconfigurationFailureNR*;
1> else if the UE initiates transmission of the *MCGFailureInformation* message due to Reconfiguration failure of E-UTRA RRC connection reconfiguration message:
   2> set the *failureType* to *reconfigurationFailureEUTRA*;
1> else if the UE initiates transmission of the *MCGFailureInformation* message due to the re-configuration with sync failure:
   2> set the *failureType* to *syncReconfigurationFailure*;
1> else if the UE initiates transmission of the *MCGFailureInformation* message due to the mobility from NR failure:
   2> set the *failureType* to *mobilityFromNR-Failure*;
1> else if the UE initiates transmission of the *MCGFailureInformation* message to provide indication of intergirty check failure:
   2> set the *failureType* to *integrityFailure*.

FIG.18

-- *MCGFailureInformation*

The *MCGFailureInformation* message is used to provide information regarding NR MCG failures detected by the UE configured with NE-DC or NR-DC.
  Signalling radio bearer: SRB1 or SRB3
  RLC-SAP: AM
  Logical channel: DCCH
  Direction: UE to network

*MCGFailureInformation message*

-- ASN1START
-- TAG-FAILUREINFORMATION-START

```
MCGFailureInformation-r16 ::=       SEQUENCE {
    criticalExtensions                  CHOICE {
        mcgFailureInformation-r16           MCGFailureInformation-r16-IEs,
        criticalExtensionsFuture            SEQUENCE {}
    }
}

MCGFailureInformation-r16-IEs ::=   SEQUENCE {
    failureReportMCG-r16                FailureReportMCG-r16                    OPTIONAL,
    lateNonCriticalExtension            OCTET STRING                            OPTIONAL,
    nonCriticalExtension                SEQUENCE {}                             OPTIONAL
}

FailureReportMCG-r16 ::=            SEQUENCE {
    failureType-r16                     ENUMERATED {
                                            t310-Expiry, randomAccessProblem, rlc-MaxNumRetx,
                                            synchReconfigFailure, mobilityFromNR-Failure,
                                            integrityFailure, reconfigurationFailureNR,
                                            reconfigurationFailureEUTRA},
    measResultFreqList-r16              MeasResultList2NR                       OPTIONAL,
    ...
}
```

FIG. 19

```
                MCGFailureInformation message (continued)

MeasResultList2NR ::=       SEQUENCE (SIZE (1..maxFreq)) OF MeasResult2NR

MeasResult2NR ::=     SEQUENCE {
    ssbFrequency              ARFCN-ValueNR                 OPTIONAL,
    refFreqCSI-RS             ARFCN-ValueNR                 OPTIONAL,
    measResultServingCell     MeasResultNR                  OPTIONAL,
    measResultNeighCellListNR MeasResultListNR              OPTIONAL,
}

-- TAG-FAILUREINFORMATION-STOP
-- ASN1STOP
```

FIG.20

– *ULInformationTransferMRDC*

The ULInformationTransferMRDC message is used for the uplink transfer of MR DC information (i.e. for the case the SCG employs another RAT e.g. for transferring the E-UTRA MCG failure information message).

Signalling radio bearer: SRB1 or SRB3 (if established)
RLC-SAP: AM
Logical channel: DCCH
Direction: UE to network

*ULInformationTransferMRDC message*

```
-- ASN1START
-- TAG-ULINFORMATIONTRANSFERMRDC-START

ULInformationTransferMRDC-16 ::=      SEQUENCE {
    criticalExtensions                CHOICE {
        ulInformationTransfer             ULInformationTransferMRDC-r16-IEs,
        criticalExtensionsFuture          SEQUENCE {}
    }
}

ULInformationTransferMRDC-r16-IEs ::= SEQUENCE {
    ul-DCCH-MessageEUTRA-r16              OCTET STRING              OPTIONAL,
    lateNonCriticalExtension              OCTET STRING              OPTIONAL,
    nonCriticalExtension                  SEQUENCE {}               OPTIONAL
}

-- TAG-ULINFORMATIONTRANSFERMRDC-STOP
-- ASN1STOP
```

*ULInformationTransferMRDC field descriptions*

*ul-DCCH-MessageEUTRA*
Includes the UL-DCCH-Message as defined in TS 36.331 [10]. In this version of the specification, the field is only used to transfer the E-UTRA RRC MeasurementReport and the E-UTRA RRC MCG failure information messages.

USER DEVICE AND BASE STATION APPARATUS

TECHNICAL FIELD

The present invention relates to a user device and a base station apparatus in a wireless communication system.

BACKGROUND ART

For NR (New Radio) (also referred to as "5G") as a successor system to LTE (Long Term Evolution), technologies that satisfy the following requirements have been considered: high capacity system, high data transmission rate, low delay, simultaneous connection of a large number of terminals, low cost, power saving and the like (for example, Non-Patent Document 1).

In the NR system, a technique called LTE-NR dual connectivity, NR-NR dual connectivity or Multi RAT (Radio Access Technology) dual connectivity (hereinafter referred to as "MR-DC") have been introduced (for example, Non-Patent Document 2), in a manner similar to the dual connectivity of the LTE system, and in which data is divided between a base station (eNB) of the LTE system and a base station (gNB) of the NR system, and these base stations simultaneously transmit and receive data.

RELATED-ART DOCUMENTS

Non-Patent Documents

Non-Patent Document 1: 3GPP TS 38.300 V15.4.0 (2018 December)

Non-Patent Document 2: 3GPP TS 37.340 V15.4.0 (2018 December)

SUMMARY OF THE INVENTION

Problem to be Solved by the Invention

In LTE-NR dual connectivity, NR-LTE dual connectivity or NR-NR dual connectivity, in a case of occurrence of a connection failure in the master cell group, a procedure to re-establish the connection is performed. Time has been required to recover the connection.

The present invention has been made in view of the foregoing. An object is to perform quick recovery from connection failures in dual connectivity performed in a wireless communication system.

Means to Solve the Problem

According to the disclosed technique, a user device is provided, which comprises a communication unit configured to perform communication to which dual connectivity is applied, wherein a master cell group and a secondary cell group are configured in the dual connectivity, a control unit configured to detect occurrence of a failure in the master cell group, and a transmission unit configured to transmit information related to the occurrence of the failure in the master cell group to a master node of the master cell group, wherein the control unit changes a primary cell to another cell by a handover to a different RAT (Radio Access Technology).

Advantage of the Invention

According to the disclosed technique, it is possible to recover quickly from connection failures in dual connectivity performed in a wireless communication system.

BRIEF DESCRIPTION OR THE DRAWINGS

FIG. 4 is a sequence diagram for explaining an operation example (2) in the embodiment of the present invention.

FIG. 5 is a flowchart for explaining the operation example (1) in the embodiment of the present invention.

FIG. 6 is a flowchart for explaining the operation example (2) in the embodiment of the present invention.

FIG. 7 is a flowchart for explaining an operation example (3) in the embodiment of the present invention.

FIG. 8 is a specification modification example (1) related to an operation example in the embodiment of the present invention.

FIG. 10 is a specification modification example (3) related to the operation example in the embodiment of the present invention.

FIG. 11 is a specification modification example (4) related to the operation example in the embodiment of the present invention.

FIG. 12 is a specification modification example (5) related to the operation example in the embodiment of the present invention.

FIG. 13 is a specification modification example (6) related to the operation example in the embodiment of the present invention.

FIG. 15 is a specification modification example (8) related to the operation example in the embodiment of the present invention.

FIG. 16 is a specification modification example (9) related to the operation example in the embodiment of the present invention.

FIG. 17 is a specification modification example (10) related to the operation example in the embodiment of the present invention.

FIG. 18 is a specification modification example (11) related to the operation example in the embodiment of the present invention.

FIG. 19 is a specification modification example (12) related to the operation example in the present, invention.

FIG. 20 is a specification modification example (13) related to the operation example in the embodiment of the present invention.

MODE FOR CARRYING OUT THE INVENTION

Hereinafter, an embodiment of the present invention will be described with reference to the drawings. The embodiment described below is an example, and the embodiment to which the present invention is applied is not limited to the following embodiment.

In operating a wireless communication system in the embodiment of the present invention, existing techniques are used appropriately. However, the existing technology is, for example, an existing LTE, but is not limited to an existing LTE. Also, the term "LTE" as used herein is to have a broad meaning, including LTE-Advanced and LTE-Advanced or later forms (e.g., NR), unless otherwise indicated.

An embodiment of the present invention described below uses the terms SS (Synchronization signal), PSS (Primary SS), SSS (Secondary SS), PBCH (Physical broadcast channel), PRACH (Physical random access channel) and the like used in existing LTEs. This is for convenience of reference and may be referred to by other names as similar signals, functions, and the like. The above terms in NR correspond to NR-SS, NR-PSS, NR-SSS, NR-PBCH, NR-PRACH and the like. However, even the signal used for NR is not always specified as "NR-".

In the embodiment of the present invention, the duplex method may be a TDD (Time Division Duplex) method, an FDD (Frequency Division Duplex) method, or other method (e.g., Flexible Duplex, etc.).

In the embodiment of the present invention, to "Configure" the wireless parameter or the like may be to "Pre-configure" a predetermined value, or may be configuration of a wireless parameter indicated by a base station apparatus 10 or a user device 20.

Figure 1:
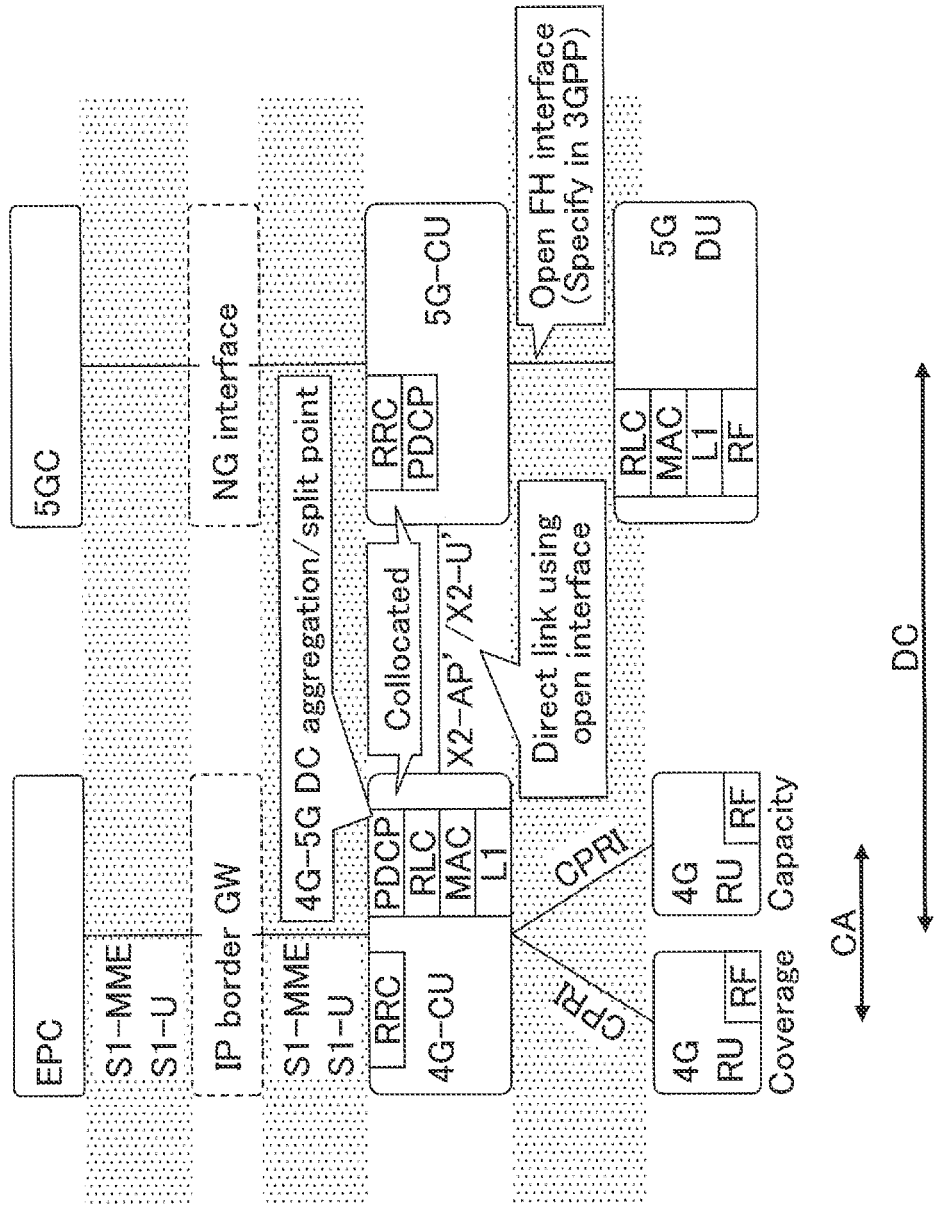
FIG. 1 is a diagram illustrating a configuration example of a network architecture in an embodiment of the present invention.

FIG. 1 is a diagram illustrating a configuration example of a network architecture in an embodiment of the present invention. As illustrated in FIG. 1, the wireless network architecture in the embodiment of the present invention includes a 4G-CU, 4G-RU (Remote Unit, remote radio station), EPC (Evolved Packet Core) and the like on the LTE-Advanced side. The wireless network architecture in the embodiment of the present invention includes a 5G-CU, 5G-DU, etc., on the 5G side.

As illustrated in FIG. 1, the 4G-CU includes layers up to the RRC (Radio Resource Control), PDCP (Packet Data Convergence Protocol), RLC (Radio Link Control), MAC (Medium Access Control) and LI (Layer 1, PHY layer or physical layer), and is connected to the 4G-RU via CPRI (Common Public Radio Interface). Network nodes containing the 4G-CU and 4G-RU are referred to as an eNB.

Furthermore, on the 5G side, as illustrated in FIG. 1, the 5G-CU includes an RRC layer, is connected to a 5G-DU by an FH (Fronthaul) interface, and is connected to a 5GC (5G Core Network) by an NG interface. The 5G-CU is also connected to the 4G-CU by the X2 interface. The PDCP layer in the 4G-CU is the coupling or separation point for performing 4G-5G DC (Dual Connectivity), namely EN-DC (E-UTRA-NR Dual Connectivity). A network node containing the 5G-CU and 5G-DU is referred to as a gNB. Also, the 5G-CU may be referred to as gNB-CU. The 5G-DU may be referred to as gNB-DU.

As illustrated in FIG. 1, a CA (Carrier Aggregation) is performed between 4G-RUs. DC is performed between the 4G-RU and 5G-DU. A UE (User Equipment), although not shown, is wirelessly connected via an RF in the 4G-RU or 5G-DU to transmit and receive packets.

FIG. 1 illustrates a wireless network architecture for DC of LTE-NR, i.e., EN-DC (E-UTRA.-NR Dual Connectivity). However, a similar wireless network architecture may be used even when the 4G-CU is separated into CU-DU or when the NR standalone operation is performed. When the 4G-CU is separated into CU-DU, the functions related to the RRC layer and the PDCP layer may be transferred to the 4G-CU and the RLC layer or lower may be included in the 4G-DU. It is noted that the CPRI data rate may be reduced by CU-DU separation.

A plurality of 5G-DUs may be connected to the 5G-CU. Also, NR-DC (NR-NR Dual Connectivity) may be performed by connecting a UE to a plurality of 5G-CUS. NR-DC may be performed by connecting a UE to a plurality of 5G-DUs and a single 5G-CU.

Figure 2:
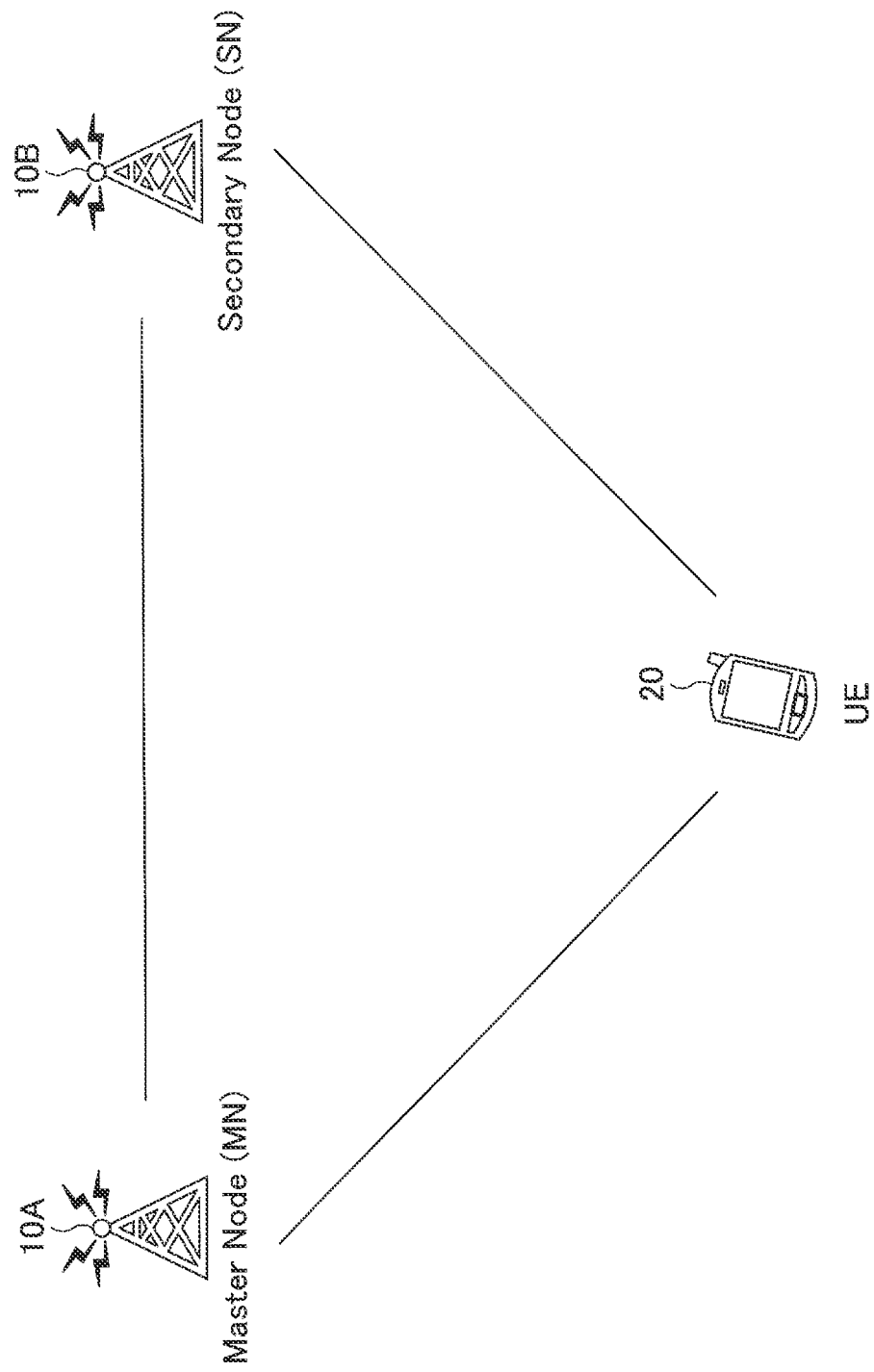
FIG. 2 is a diagram illustrating a configuration example of a wireless communication system in the embodiment of the present invention.

FIG. 2 is a diagram illustrating a configuration example of a wireless communication system in the embodiment of the present invention. FIG. 2 is a schematic diagram illustrating a wireless communication system for MR-DC (Multi-RAT Dual Connectivity).

As illustrated in FIG. 2, the user device 20 communicates with a base station apparatus 10A provided by the NR system and a base station apparatus 10B provided by the NR system (which may be hereafter referred to as "base station apparatus 10" if the base station apparatus 10A and the base station apparatus 10B are not distinguished). Furthermore, the user device 20 supports NR-NR dual connectivity, namely NR-DC, in which the base station apparatus 10A is a master node (hereinafter referred to as "MN") and the base station apparatus 10B is a secondary node (hereinafter referred to as "SN"). The user device 20 can simultaneously use a plurality of component carriers provided by the base station apparatus 10A which is the master node and the base station apparatus 10B which is the secondary node, to perform simultaneous transmission or reception with the base station apparatus 10A which is the master node and the base station apparatus 10B which is the secondary node. It is noted that the master node may provide a master cell group (hereinafter referred to as "MCG (Master Cell Group)") by adding cells in performing the CA. The secondary node may provide a secondary cell group (hereinafter referred to as "SCG (Secondary Cell Group)") by adding cells in performing the CA.

Also, as illustrated in FIG. 2, the user device 20 may communicate with the base station apparatus 10A provided by the LTE system and the base station apparatus 10B provided by the NR system. Further, the user device 20 may support LTE-NR dual connectivity, that is, EN-DC, where the base station apparatus 10A is an MN and the base station apparatus 10B is an SN. The user device 20 can simultaneously use a plurality of component carriers provided by the base station apparatus 10A which is the master node and the base station apparatus 10B which is the secondary node, to perform simultaneous transmission or reception with the base station apparatus 10A which is the master node and the base station apparatus 10B which is the secondary node.

As also illustrated in FIG. 2, the user device 20 may communicate with the base station apparatus 10A provided by the NR system and the base station apparatus 10B provided by the LTE system. Further, the user device 20 may support NA-LTE dual connectivity, that is, NE-DC (NR-E-UTRA Dual Connectivity), where the base station apparatus 10A is an MN and the base station apparatus 10B is an SN. The user device 20 can simultaneously use a plurality of component carriers provided by the base station apparatus 10A which is the master node and the base station apparatus 10B which is the secondary node, to perform simultaneous transmission or reception with the base station apparatus 10A which is the master node and the base station apparatus 10B which is the secondary node.

The following embodiments will be described in terms of LTE-NR dual connectivity, NR-LTE dual connectivity, or NR-NR dual connectivity. However, the user device 20 in accordance with the embodiment of the present invention is not limited to the dual connectivity described above, but is applicable to dual connectivity, i.e., MR-DC, between multiple wireless communication systems utilizing different RATs.

Supporting fast recovery in MR-DC is being considered herein. Fast recovery is a method of using, for example, a link and split SRB (Split signaling radio bearer) of a secondary cell group for recovery from a failure in a master cell group.

An RLF (Radio Link Failure) is determined by separation in an MCG and an SCG. If an RLF is detected in the MCG, the user device 20 begins a procedure of RRC connection re-establishment. It is noted that NGEN-DC (NG-RAN E-UTRA-NR Dual Connectivity) is dual connectivity between an eNB that is a master node connected to the 5GC and a gNB that is a secondary node.

Furthermore, the following cases 1)-4) for an SCG failure are supported.
 1) RLF in an SCG;
 2) SN change failure;
 3) In EN-DC, NGEN-DC or NR-DC, SCG configuration failure in an SRB3;
 4) In EN-DC, NGEN-DC or NR-DC, SCG integrity check failure in the SRB3.

If an RLF is detected in the SCG, the user device 20 interrupts the transmission of all radio bearers in the SCG and transmits "SCG Failure Information" to the MN instead of re-establishing the connection. In the event of an SCG failure, the user device 20 maintains the current measurement configurations for both MN and SN, and continues the measurement, if possible, based on the same measurement configurations. The measurement in the SN is reported via the MN after the SCG failure has occurred.

The user device 20 includes measurement results based on current measurement configurations for both MN and SN in the SCG failure information message. The MN processes the SCG failure information message and determines whether to maintain, change or release the SN or SCG. In all cases of the above SCG failures, the measurement results based on the SN configurations and the SCG failure type may be forwarded to an old SN and/or a new SN.

There are cases 1)-3) below as cases of cell group failure in MR-DC. An SCG failure type may be information indicating any of the cases 1)-3).
 1) Occurrence of only an SCG failure;
 2) Occurrence of only an MCG failure;
 3) Occurrence of both of MCG and SCG failures.

In the case of occurrence of only an MCG failure in 2) above, the MCG is recovered while the communication is continued in the SCG as a fast recovery function. Note that in the case of occurrence of both MCG failure and SCG failure described in 3) above, RRC connection re-establishment is performed.

As a method of achieving fast recovery in the case of occurrence of only an MCG failure in 2) above, for example, the MCG transmission is suspended and the MCG failure information is transmitted to the SN. Measurement of the MCG continues. After the MN receives the MCG failure information, the MN decides whether to maintain or change the MCG, or performs an intra-RAT handover or an inter-RAT handover that switches the SCG to the MCG.

Figure 3:
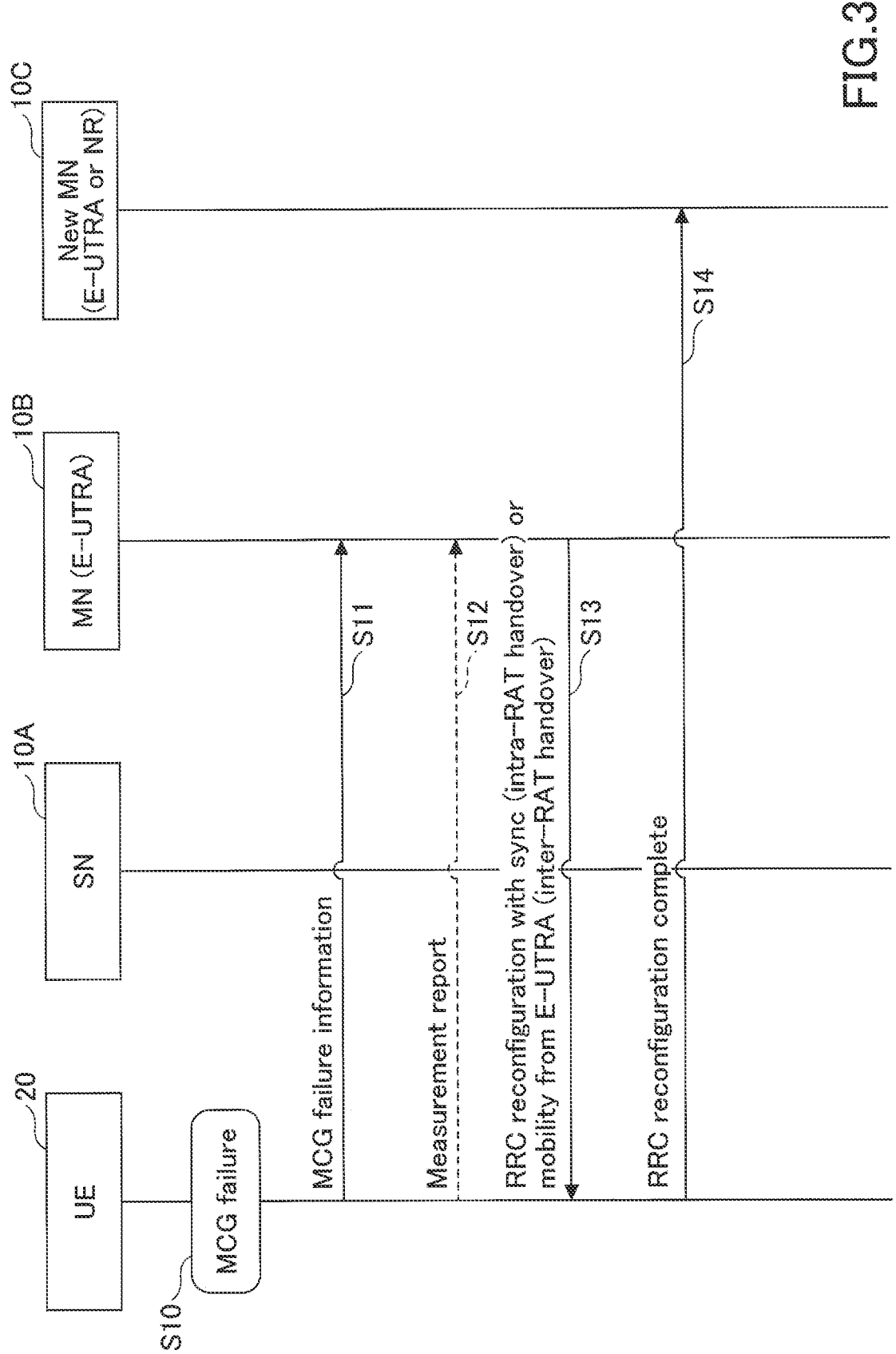
FIG. 3 is a sequence diagram for explaining an operation example (1) in the embodiment of the present invention.

FIG. 3 is a sequence diagram for explaining an operation example (1) in the embodiment of the present invention. With reference to FIG. 3, a procedure for changing the MN by a handover when an MCG failure occurs in EN-DC is described. The SN 10A illustrated in FIG. 3 is a gNB. The MN 10B is an eNB.

In step S10, the UE 20 detects an MCG failure. Thereafter, the UE 20 transmits MCG failure information to the MN 10B (S11). In step S12, the UE 20 may transmit a Measurement report to the MN 10B. It is noted that the MCG failure information and measurement report may be transmitted to the MN 10B by the SN 10A on an SRB1 to which a split SRB is applied, or on an SRB3 by the SN 10A to the MN 10B.

In step S13, the MN 10B, on the basis of the MCG failure information, instructs the UE 20 to perform an intra-RAT handover by an RRC reconfiguration with sync, or an inter-RAT handover by mobility from E-UTRA. Thereafter, the UE 20 performs a handover and transmits RRC reconfiguration complete to a new MM 10C (S14) in E-UTRA or NR.

FIG. 4 is a sequence diagram for explaining an operation example (2) in the embodiment of the present invention. With reference to FIG. 4, a procedure for changing the SN to the master node when an MCG failure occurs in EN-DC is described. The SN 10A illustrated in FIG. 4 is a gNB or eNB. The MN 10B is an eNB.

In step S20, the UE 20 detects an MCG failure. Thereafter, the UE 20 transmits MCG failure information to the MN 10B (S21). In step S22, the UE 20 may transmit a Measurement report to the MN 10B. It is noted that, as in FIG. 3, the MCG failure information and Measurement report may be transmitted to the MN 10B by the SN 10A on the SRB1 to which the split SRB is applied, or transmitted to the MN 10B by the SN 10A on the SRB3.

In step S23, the MN 10B instructs the UE 20 to perform an intra-RAT handover by RRC reconfiguration with sync or perform an inter-RAT handover by mobility from E-UTRA, on the basis of the MCG failure information. Thereafter, the UE 20 transmits RRC reconfiguration complete to the SN 10A in E-UTRA or NR (S24). In step S25, the SN 10A becomes an eNB or gNB and operates as an MN.

FIG. 5 is a flowchart for explaining the operation example (1) in the embodiment of the present invention. With reference to FIG. 5, a detailed procedure is described which is performed when an MCG failure occurs in the EN-DC.

In step S30, the user device 20 detects that an MCG failure has occurred in EN-DC and proceeds to step S31 or step S33 in accordance with the communication environment or the measurement result.

In step S31, the PCell (Primary Cell) is changed to another E-UTRA cell by performing Intra-RAT handover (RRC connection reconfiguration with mobility control information). Thereafter, the user device 20 continues EN-DC by performing handover of the E-UTRA-PCell alone while maintaining the NR-SN connection (S32).

In step S33, the PCell is changed to an NR cell by performing Inter-RAT handover (mobility from E-UTRA) from E-UTRA to NR. Thereafter, it is determined whether or not the network supports NR-DC (S34). If the network supports NR-DC (YES in S34), the process proceeds to step S35. If the network does not support NR-DC (NO in S34), the process proceeds to step S36. In step S35, the user device 20 starts NR-DC by performing handover to the NR-PCell while maintaining the NR-SN connection. Meanwhile, in step S36, the user device 20 releases the NR-SN and performs handover to the NR-PCell. Any of the cells of an SCG may be a PCell.

FIG. 6 is a flowchart for explaining the operation example (2) in the embodiment of the present invention. With reference to FIG. 6, a detailed procedure is described which is performed when an MCG failure occurs in NE-DC.

In step S40, the user device 20 detects that an MCG failure has occurred in NE-DC and proceeds to step S41 or step S43 in accordance with the communication environment or the measurement result.

In step S41, the PCell (Primary Cell) is changed to another NR cell by performing Intra-RAT handover (RRC connection reconfiguration with sync). Thereafter, the user device 20 continues NE-DC by performing handover of the NR-PCell alone while maintaining the E-UTRA-SN connection (S42).

In step S43, the PCell is changed to an E-UTRA ceil by an Inter-RAT handover from NR to E-UTRA (mobility from NR). Thereafter, it is determined whether or not the network supports E-UTRA-DC (S44). If the network supports E-UTRA-DC (YES in S44), the process proceeds to step S45. If the network does not support E-UTRA-DC (NO in S44), the process proceeds to step S46. In step S45, the user device 20 performs handover to an E-UTRA-PCell while connecting an E-UTRA-SN and initiates E-UTRA-DC. Meanwhile, in step S46, the user device 20 releases the E-UTRA-SN and performs handover to the NR-PCell. Any of the cells of an SCG may be a PCell.

FIG. 7 is a flowchart for explaining an operation example (3) in the embodiment of the present invention. With reference to FIG. 7, a detailed procedure is described which is performed when an MCG failure occurs in the NR-DC.

In step S50, the user device 20 detects that an MCG failure has occurred in NR-DC and proceeds to step S51 or step S53 in accordance with the communication environment or the measurement result.

In step S51, the PCell (Primary Cell) is changed to another NR cell by performing Intra-RAT handover (RRC connection reconfiguration with sync). Thereafter, the user device 20 continues NR-DC by performing handover of the NR-PCell alone while maintaining the NR-SN connection (S52).

In step S53, the PCell is changed to an E-UTRA cell by performing Inter-RAT handover (mobility from NR) from NR to E-UTRA. Thereafter, it is determined whether or not the network supports NGEN-DC (S54). If the network supports NGEN-DC (YES in S54), then the process proceeds to step S5S. If the network does not support NGEN-DC (NO in S54), then the process proceeds to step S56. In step S55, the user device 20 starts the NGEN-DC by performing handover to an E-UTRA-PCell while maintaining the NR-SN connection. Meanwhile, in step S56, the user device 20 releases the NR-SN and performs handover to the E-UTRA-PCell.

FIG. 8 is a specification modification example (1) related to an operation example in the embodiment of the present invention. As illustrated in FIG. 8, MCG failures are handled. For MCG failures, the following cases 1)-5) are supported. An MCG failure type may be information indicating any of the cases 1)-5).
1) RLF in an MCG;
2) Failure in re-configuration with sync in an MCG;
3) Failure in mobility from NR;
4) RFC connection reconfiguration failure on SRB1;
5) Integrity check failure on SRB1 or SRB2.

When an MCG failure occurs, the UE with the fast recovery function interrupts transmission in the MCG and transmits the "MCG Failure Information" to an MN instead of re-establishing the connection. If a split SRB is applied to an SRB1, MCG failure information may be transmitted via an SCG by the SRB1 regardless of whether an SRB3 is configured. If no split SRB is applied to an SRB1 and the SRB3 is configured, then MCG failure information may be transmitted by the SRB3. An SN transfers the MCG failure information to the MN. In the event of occurrence of an MCG failure, the user device 20 maintains the current measurement configurations for both MN and SN, and continues the measurement, if possible, based on the measurement configurations. Measurements in the SN are reported via the MN after an SCG failure has occurred.

The user device 20 includes measurement results based on the current measurement configurations for both MN and SN in the MCG failure information message. The MN processes the MCG failure information message and determines whether to maintain, change or release the MN or MCG. In all of the above-mentioned cases of MCG failure, measurement results based on MN configurations and MCG failure types may be forwarded to an old MN and/or a new MN.

Figure 9:
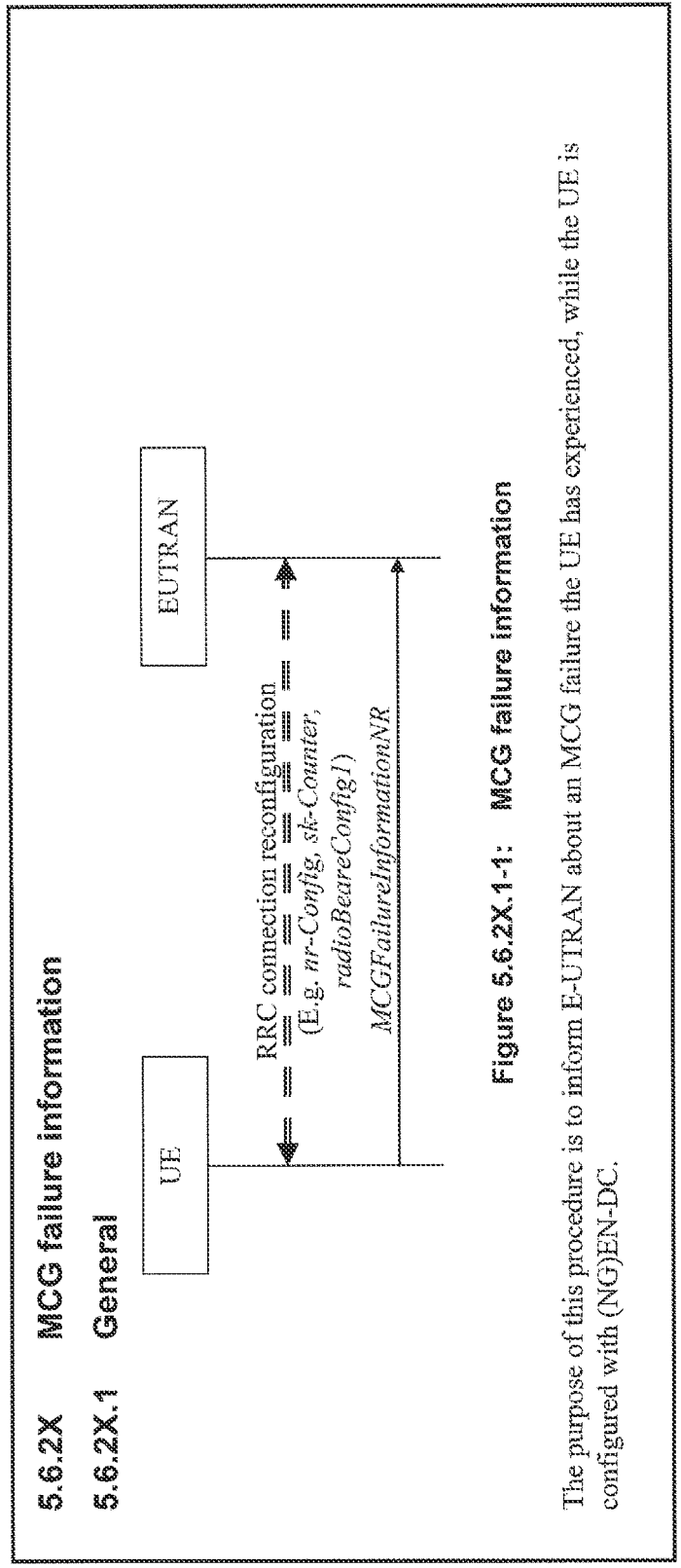
FIG. 9 is a specification modification example (2) related to the operation example in the embodiment of the present invention.

FIG. 9 is a specification modification example (2) related to the operation example in the embodiment of the present invention. As illustrated in FIG. 9, the UE may transmit MCG failure information (MCGFailureInformationNR) to the master node in E-UTRAN or in EN-DC or NGEN-DC.

FIG. 10 is a specification modification example (3) related to the operation example in the embodiment of the present invention. As illustrated in FIG. 10, MCG failure information is transmitted. When the procedure for transmitting MCG failure information is initiated, the UE 20 stops a predetermined timer and interrupts all transmission in the MCG. Thereafter, after the MCG-MAC is reset, processing steps of the portion enclosed by the dashed line, that is,
1) Release the MCG SCell that is configured;
2) Apply a default physical channel configuration to the MCG;
3) Apply a default semi-persistent scheduling configuration to the MCG;
4) Apply a default MAC main configuration to the MCG;
5) Release configured idc-config, i.e., the configuration related to intra-device interference.

The processing steps described in 1)-5) above may or may not be performed. Thereafter, the UE 20 starts transmitting MCG failure information.

FIG. 11 is a specification modification example (4) related to the operation example in the embodiment of the present invention. As illustrated in FIG. 11, the UE 20 configures the contents of the MCG failure information. For example, a failure type (FailureType) and measurement results (measResultBestNeighCell, measResultNeighCells, measResultListEUTRA) are included in the MCG failure information.

FIG. 12 is a specification modification example (5) related to the operation example in the embodiment of the present invention. As illustrated in FIG. 12, failure types (Failure-Type) of 1)-9) below may be determined and included in the MCG failure information.
1) Timer T310 expiry (T310 is a timer that detects the physical layer failure of a PCell);
2) Random access failure;
3) Excess in the number of events of RLC retransmission;
4) Timer T312 expiry (T312 is a timer that triggers measurement reports during T310 operation);
5) Failure in RRC reconfiguration in NR;
6) Failure in RRC reconfiguration in E-UTRA;
7) Handover failure;
8) Failure in mobility from E-UTRA;
9) Integrity check failure.

FIG. 13 is a specification modification example (6) related to the operation example in the embodiment of the present invention. As illustrated in FIG. 13, an information element of MCG failure information "MCGFailureInformation" is configured. "MCGFailureInformation" is transmitted from the UE 20 to E-UTRAN using a signaling radio bearer SRB1.

Figure 14:
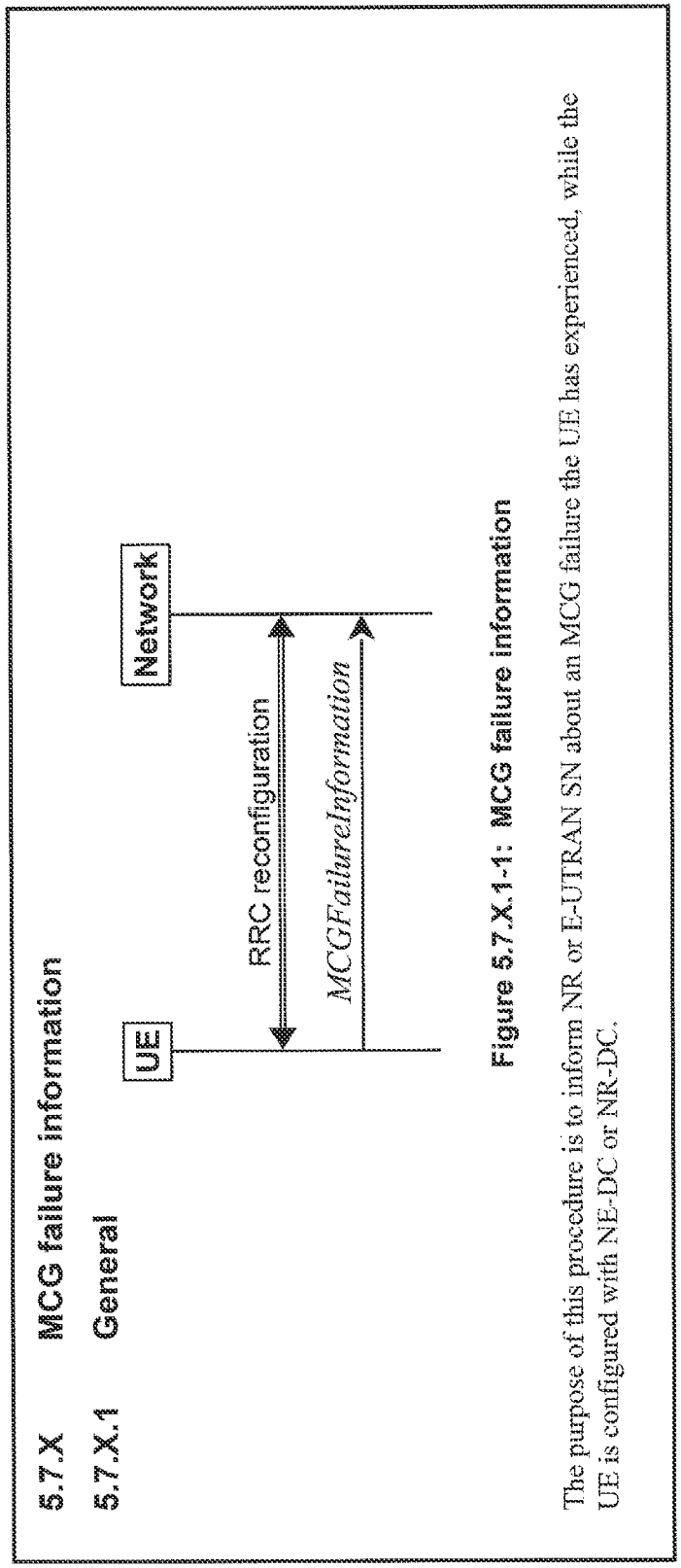
FIG. 14 is a specification modification example (7) related to the operation example in the embodiment of the present invention.

FIG. 14 is a specification modification example (7) related to the operation example in the embodiment of the present invention. As illustrated in FIG. 14, the UE may transmit MCG failure information (MCGFailureInformation) to a master node in the network, i.e., NE-DC or NR-DC.

FIG. 15 is a specification modification example (8) related to the operation example in the embodiment of the present invention. As illustrated in FIG. 15, MCG failure information is transmitted. When the procedure for transmitting MCG failure information is initiated, the UE 20 stops a predetermined timer and interrupts all transmission in the MCG. Thereafter, after the MCG-MAC is reset, processing steps of the portion enclosed by the dashed line, that is,
1) Release the MCG SCell that is configured;
2) Release the current dedicated serving cell configuration;
3) Release the configuration for a stop timer for report delay;
4) Release the configuration for the stop timer related to assistance information report.

The processing steps described in 1)-4) above may or may not be performed. Thereafter, the UE 20 starts transmitting MCG failure information.

FIG. 16 is a specification modification example (9) related to the operation example in the embodiment of the present invention. As illustrated in FIG. 16, the user device 20 configures the contents of the MCG failure information. For example, failure type (FailureType) and measurement results (measResultMCG, measultFreqListNR) are included in the MCG failure information.

FIG. 17 is a specification modification example (10) related to the operation example in the embodiment of the present invention. As illustrated in FIG. 17, failure types (FailureType) of 1)-8) below may be determined and included in the MCG failure information.
1) Timer T310 expiry (T310 is the timer that detects the physical layer failure of a PCell);
2) Random access failure;
3) Excess in the number of events of RLC retransmission;
4) Failure in RRC reconfiguration in NR;
5) Failure in RRC reconfiguration in E-UTRA;
6) Failure in RRC reconfiguration with sync;
7) Failure in mobility from NR;
8) Integrity check failure.

As noted above, a failure type when the MCG is in NR may be different from a failure type when the MCG illustrated in FIG. 12 is in E-UTRA.

FIG. 18 is a specification modification example (11) related to the operation example in the embodiment of the present invention. As illustrated in FIG. 18, an information element of MCG failure information "MCGFailureInformation" is configured. "MCGFailureInformation" is transmitted from the UE 20 to the network using a signaling radio bearer SRB1 or SRB3.

FIG. 19 is a specification modification example (12) related to the operation example in the embodiment of the present invention. As illustrated in FIG. 19, the information element "MeasResult2NR" representing the measurement result is included in the MCG failure information "MCGFailureInformation".

FIG. 20 is a specification modification example (13) related to the operation example in the embodiment of the present invention. As illustrated in FIG. 19, MCG failure information "MCGFailureInformation" is transmitted to the network using the signaling radio bearer SRB1 or SRB3 by an information element "ULInformationTransferMRDC" used for transmitting the information pertaining to MR-DC.

According to the above-described embodiment, the user device 20 can continue communication by using the SCG even after occurrence of an MCG failure, and quickly recover the MCG by configuring the MN.

Consequently, it is possible to recover quickly from a connection failure in dual connectivity performed by the wireless communication system.

[Equipment Configuration]

Next, a functional configuration example of the base station apparatus 10 and the user device 20 that perform the processes and operations described above will be described. The base station apparatus 10 and the user device 20 include functions for implementing the embodiment described above. However, the base station apparatus 10 and the user device 20 may each comprise only some of the functions in the embodiment.

[Base Station Apparatus 10]

Figure 21:
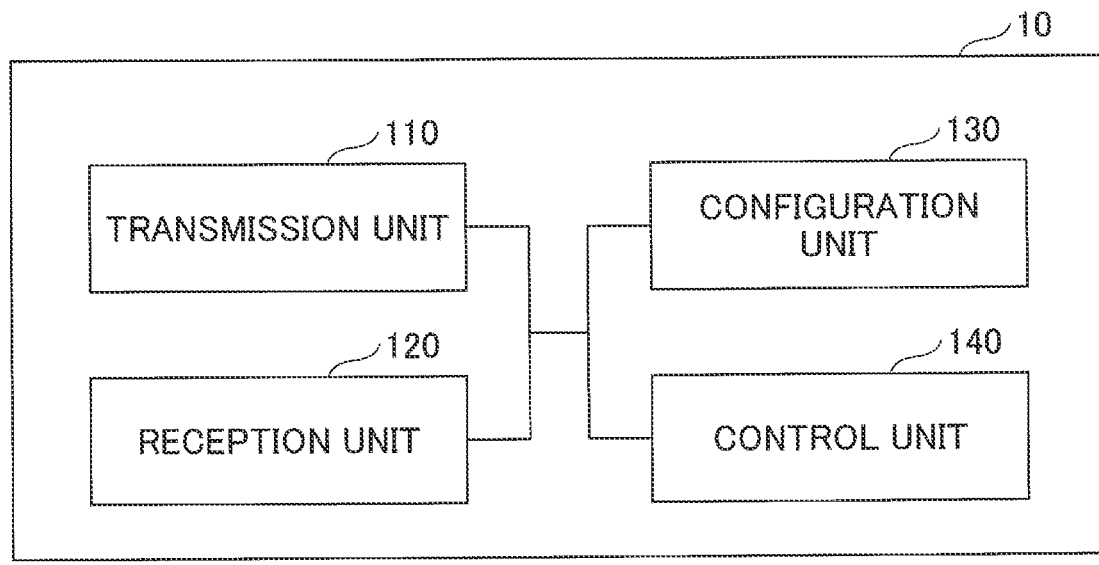
FIG. 21 is a diagram illustrating an example of a functional configuration of a base station apparatus 10 in the embodiment of the present invention.

FIG. 21 is a diagram illustrating an example of a functional configuration of the base station apparatus 10 in the embodiment of the present invention. As illustrated in FIG. 21, the base station apparatus 10 includes a transmission unit 110, a reception unit 120, a configuration unit 130 and a control unit 140. The functional configuration illustrated in FIG. 21 is only one example. Function components may have any functional category and any name in consideration that the operation according to the embodiment of the present invention can be performed.

The transmission unit 110 includes a function for generating a signal to be transmitted to a side of the user device 20, and transmitting the signal wirelessly. The transmission unit 110 transmits a message between network nodes to the other network nodes. The reception unit 120 includes a function for receiving various signals transmitted from the user device 20 and acquiring, for example, information of a higher layer from the received signals. The transmission unit 110 has a function to transmit NR-PSS, NR-SSS, NR-PBCH, DL/UL control signals, or the like to the user device 20. The reception unit 120 receives a message between network nodes from other network nodes.

The configuration unit 130 stores the preset configuration information and various elements of configuration information to be transmitted to the user device 20. The contents of the configuration information are, for example, information used for configuring dual connectivity.

As described in the embodiment, the control unit 140 performs the control related to dual connectivity and the control related to the recovery process of the connection. A function unit related to signal transmission in the control unit 140 may be included in the transmission unit 110, and a function unit related to signal reception in the control unit 140 may be included in the reception unit 120.

[User Device 20]

Figure 22:
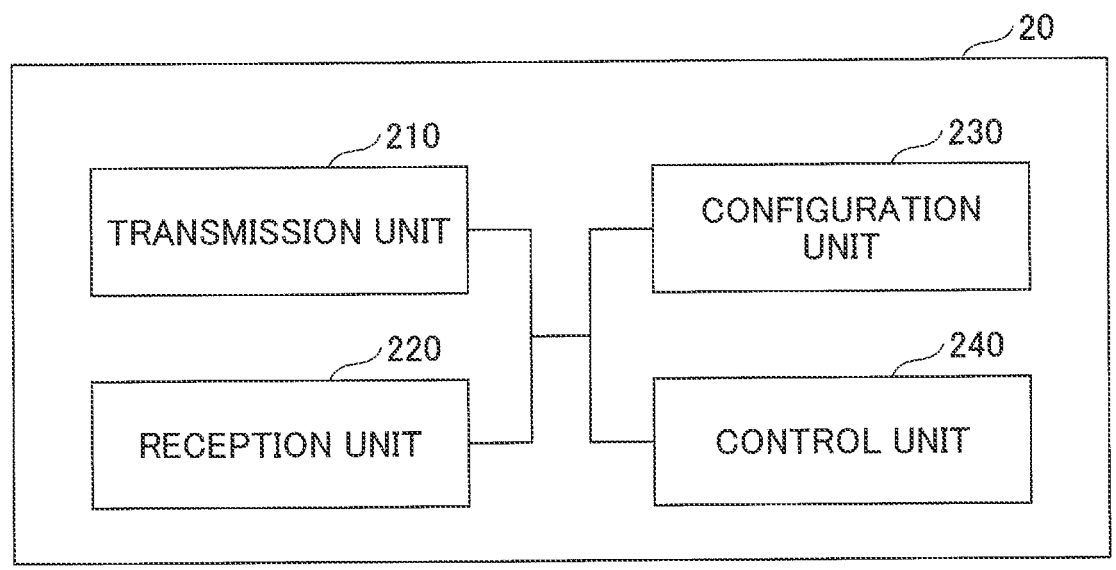
FIG. 22 is a diagram illustrating an example of a functional configuration of a user device 20 in the embodiment of the present invention.

FIG. 22 is a diagram illustrating an example of a functional configuration of the user device 20 in the embodiment of the present invention. As illustrated in FIG. 22, the user device 20 includes a transmission unit 210, a reception unit 220, a configuration unit 230 and a control unit 240. The functional configuration illustrated in FIG. 22 is only one example. Function components may have any functional category and any name in consideration that the operation according to the embodiment of the present invention can be performed.

The transmission unit 210 creates a transmission signal from data of transmission, and wirelessly transmits the transmission signal. The reception unit 220 receives various signals wirelessly and acquires signals from higher layers from the received signals of the physical layer. The reception unit 220 has a function to receive NR-PSS, NR-SSS, NR-PBCH, DL/UL/SL control signals or the like transmitted from the base station apparatus 10. For example, the transmission unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel) and the like to another user device 20 as D2D communication. The reception unit 120 receives PSCCH, PSSCH, PSDCH, PSDCH, PSBCH or the like from another user device 20.

The configuration unit 230 stores various elements of configuration information received from the base station apparatus 10 by the reception unit 220. The configuration unit 230 also stores the preset configuration information. The contents of the configuration information are, for example, information related to the configuration for performing dual connectivity.

The control unit 240 performs control related to dual connectivity and control related to recovery processing for connection in the user device 20 as described in the embodiment. Function components related to signal transmission in the control unit 240 may be included in the transmission unit 210, and function components related to signal reception in the control unit 240 may be included in the reception unit 220.

[Hardware Configuration]

Block diagrams (FIGS. 21 and 22) used in the description of the above embodiment illustrate blocks of functional units. These functional blocks (components) are implemented by any combination of at least one of hardware and software. In addition, the implementation method of each function block is not particularly limited. That is, each functional block may be implemented by using a single device that is physically or logically combined. Two or more devices that are physically or logically separated may be directly or indirectly connected (e.g., by using wired, wireless, etc.), to implement each functional block by using these multiple devices. The functional block may be implemented by combining software with the device or the plural devices.

Functions include, but are not limited to, judgment, decision, determination, calculation, computing, processing, derivation, research, search, verification, reception, transmission, output, access, resolution, selection, choosing, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the realization method is not particularly limited.

Figure 23:
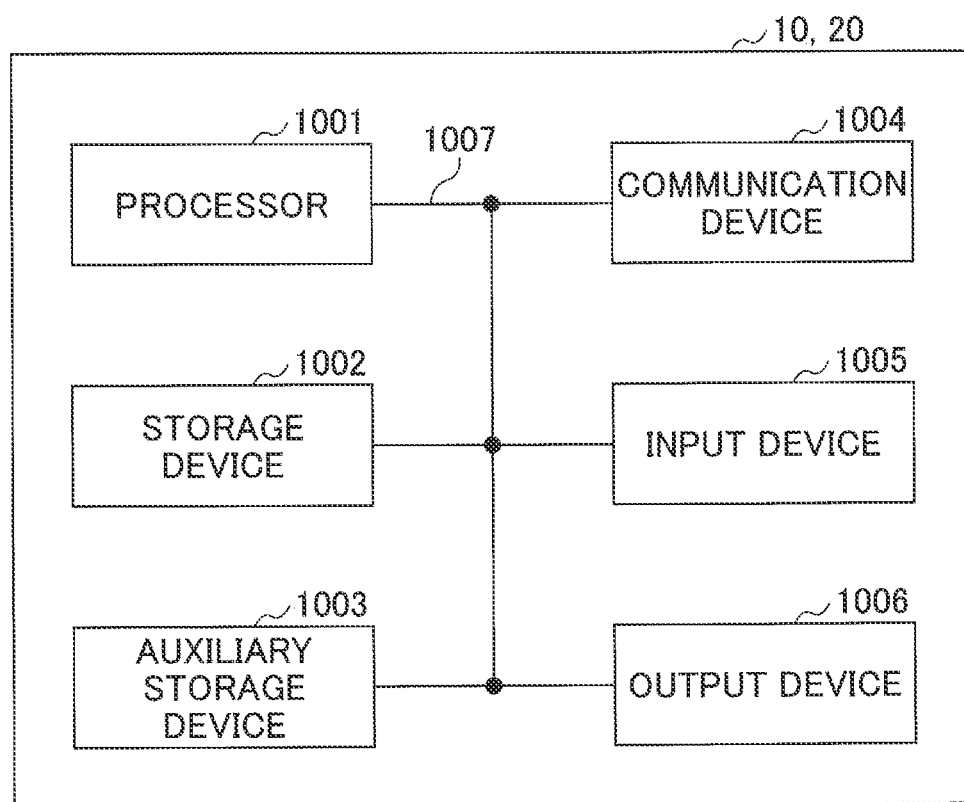
FIG. 23 is a diagram illustrating an example of the hardware configuration of the base station apparatus 10 or the user device 20 in the embodiment of the present invention.

For example, the base station apparatus 10, the user device 20 and the like according to an embodiment of the present disclosure may function as a computer for processing the radio communication method of the present disclosure. FIG. 23 is a diagram illustrating an example of the hardware configuration of the base station apparatus 10 and the user device 20 according to an embodiment of the present disclosure. The base station apparatus 10 and the user device 20 described above may be physically configured as a computer device including a processor 1001, a storage device 1002, an auxiliary storage device 1003, a communication device 1004, an input device 1005, an output device 1006, a bus 1007 and the like.

In the following description, the term "apparatus" can be read as circuits, devices, units, and the like. The hardware configuration of the base station apparatus 10 and the user device 20 may be configured to include one or more of the devices illustrated in the drawings or may be configured without some of the devices.

For each function in the base station apparatus 10 and the user device 20, predetermined software (programs) is read on hardware such as the processor 1001 and the storage device 1002 to have the processor 1001 perform an operation. Each function in the base station apparatus 10 and the user device 20 is realized by controlling communication with the communication device 1004 and controlling at least one of reading and writing of data in the storage device 1002 and the auxiliary storage device 1003.

The processor 1001 runs, for example, an operating system to control the entire computer. The processor 1001 may be constituted by a central processing unit (CPU) including an interface for peripheral devices, a controller, an arithmetic unit, a register, and the like. For example, the above-described control unit 140, control unit 240 and the like may be implemented by the processor 1001.

The processor 1001 reads out a program (program code), software module, data or the like from at least one of the auxiliary storage device 1003 and the communication device 1004 to the storage device 1002 and performs various steps of processing in accordance therewith. As a program, a program that causes a computer to execute at least a part of the operation described in the above-described embodiment is used. For example, the control unit 140 of the base station apparatus 10 illustrated in FIG. 21 may be implemented by a control program stored in the storage device 1002 and operating in the processor 1001. For example, the control unit 240 of the user device 20 illustrated in FIG. 22 may be implemented by a control program stored in the storage device 1002 and operating in the processor 1001. Although it has been described that the foregoing processes are executed by one processor 1001, they may be executed simultaneously or sequentially by two or more processors 1001. The processor 1001 may be implemented by one or more chips. The program may be transmitted from the network via a telecommunication line.

A storage device 1002 is a computer-readable recording medium and may be constituted by at least one of, for example, ROM (Read Only Memory), EPROM (Erasable Programmable ROM), EEPROM (Electrically Erasable Programmable ROM), RAM (Random Access Memory), and the like. The storage devise 1002 may be referred to as a register, cache, main memory (main storage device) or the like. The storage device 1002 can store programs (program code), software modules, etc., executable to implement a communication method according to an embodiment of the present disclosure.

The auxiliary storage device 1003 is a computer-readable recording medium, and may comprise at least one of an optical disk, such as a CD-ROM (Compact Disc ROM), a hard disk drive, a flexible disk, a magneto-optical disk (e.g., a compact disk, a digital versatile disk, a Blu-ray (registered trademark) disk), a smart card, a flash memory (e.g., a card, a stick, a keydrive), a floppy (registered trademark) disk, a magnetic strip and the like. The storage medium described above may be, for example, a database, a server, or other suitable medium that includes at least one of the storage device 1002 and the auxiliary storage device 1003.

The communication device 1004 is a hardware (transmitting/receiving device) for performing communication between computers via at least one of a wired network and a wireless network, and is also referred to as a network device, a network controller, a network card, a communication module or the like. The communication device 1004 may comprise a high frequency switch, duplexer, filter, frequency synthesizer or the like, for example, to implement at least one of a frequency division duplex (FDD) and a time division duplex (TDD). For example, the transmitting/receiving antenna, the amplifier unit, the transmitting/receiving unit, the transmission line interface and the like may be implemented by the communication device 1004. The transmitting/receiving unit may be physically or logically isolated implementations of the transmitters and receivers.

The input device 1005 is an input device (e.g., a keyboard, mouse, microphone, switch, button, sensor, etc.) that receives external inputs. The output device 1006 is an output device (e.g., a display, speaker, LED lamp, etc.) that implements external outputs. The input device 1005 and the output device 1006 may have an integrated configuration (for example, a touch panel).

Each device, such as the processor 1001 and the storage device 1002, is connected by the bus 1007 for communicating information. The bus 1007 may be constructed by using a single bus or may be constructed by using different buses between devices.

The base station apparatus 10 and the user device 20 may also include hardware, such as a microprocessor, a digital signal processor (DSP), an ASIC (Application Specific Integrated Circuit), a PLD (Programmable Logic Device) and an FPGA (Field Programmable Gate Array). All or part of each function block may be realized by the hardware. For example, the processor 1001 may be implemented using at least one of these hardware devices.

Summary of the Embodiment

As described above, according to an embodiment of the present invention, a user device is provided, which comprises a communication unit configured to perform communication to which dual connectivity is applied, wherein a master cell group and a secondary cell group are configured in the dual connectivity, a control unit configured to detect occurrence of a failure in the master ceil group, and a transmission unit configured to transmit information related to the occurrence of the failure in the master cell group to a master node of the master cell group, wherein the control unit changes a primary cell to another cell by a handover to a different RAT (Radio Access Technology).

With the above-described configuration, the user device 20 can continue communication by using the SCG even after an MCG failure has occurred, and quickly recover the MCG by configuring an MN. Thus, it is possible to recover quickly from connection failure in the dual connectivity performed by the wireless communication system.

The transmission unit may transmit the information related to the occurrence of the failure in the master cell group to the master node via a secondary node of the secondary cell group using a split signaling radio bearer. The configuration allows the user device 20 to transmit MCG failure information to the master node via the secondary node.

The transmission unit may transmit the information related to the occurrence of the failure in the master cell group to the master node via a secondary node using a signaling radio bearer configured in the secondary node of the secondary cell group. The configuration allows the user device 20 to transmit MCG failure information to the master node via the secondary node.

The control unit may change the primary cell to another cell by the handover to the different RAT while the communication unit continues connection to a secondary node of the secondary cell group. This configuration allows communication to continue by using the SCG and configure the MNs of other RATs even after MCG failures occur.

The control unit may release the secondary cell group and change the primary cell to a cell included in the secondary cell group by the handover to the different RAT. With this configuration, the MN can be configured quickly by using a cell included in the SCG as the primary cell.

According to an embodiment of the present invention, a base station apparatus, which comprises a communication unit configured to perform communication to which dual connectivity is applied, wherein a master cell group and a secondary cell group are configured in the dual connectivity, a reception unit configured to receive information related to occurrence of a failure in the master cell group from a user device, and a control unit configured to determine whether to maintain, change or release the master cell group based on the information related to the occurrence of the failure in the master cell group, wherein the control unit causes the user device to change a primary cell to another cell by a handover to a different RAT (Radio Access Technology).

With the above-described configuration, the user device 20 can continue communication by using the SCG even after an MCG failure has occurred, and quickly recover the MCG by configuring an MN. Thus, it is possible to recover quickly from connection failure in the dual connectivity performed by the wireless communication system.

Supplement to the Embodiment

Although the embodiment of the present invention has been described heretofore, the disclosed invention is not limited to such an embodiment, and various variants, modifications, alternatives, substitutions, etc. will be understood by those skilled in the art. Specific numerical examples have been used to facilitate understanding of the invention, but unless otherwise indicated, they are merely examples and any appropriate values may be used. Classification of items in the above description is not essential to the present invention. The items described in two or more items may be used in combination as needed, or the items described in one item may be applied to the items described in another item (unless contradictory). The functional or processing component boundaries in the functional block diagrams do not necessarily correspond to the physical part boundaries. The operation of the plurality of functions of the functional components may be performed physically by one element, or the operation of one function may be performed physically by the plurality of elements. As for the processing procedure described in the embodiment, the order of steps of the processing may be changed unless contradictory. For convenience of process description, the base station apparatus 10 and the user device 20 have been described by using functional block diagrams, but such devices may be implemented in hardware, software, or a combination thereof. Software operated by a processor of the base station apparatus 10 in accordance with the embodiment of the present invention and software operated by a processor of the user device 20 in accordance with the embodiment of the present invention may be stored in a random access memory (RAM), flash memory, read-only memory (ROM), EPROM, EEPROM, register, hard disk (HDD), removable disk, CD-ROM, database, server or any other suitable storage medium.

Information may also be indicated in other ways, as well as in the aspect/embodiment described in this disclosure. For example, indication of information may be performed by physical layer signaling (e.g., DCI (Downlink Control Information) or UCI (Uplink Control Information)), upper layer signaling (e.g., RRC (Radio Resource Control) signaling, MAC (Medium Access Control) signaling, broadcast information (MIB (Master Information Block) or SIB (System Information Block)), other signals, or a combination thereof. Also, RRC signaling may be referred to as RRC messages, e.g., RRC Connection Setup messages, RRC connection Reconfiguration messages, etc.

Each aspect/embodiment described in this disclosure may be applied to at least one of: LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), the systems utilizing other appropriate systems, and the next generation systems extended on the basis thereof. Multiple systems may also be applied in combination (e.g., at least one of LTE and LTE-A in combination with 5G, etc.).

The processing procedures, sequences, flowcharts, etc. of each aspect/embodiment described herein may be reordered unless contradictory. For example, the methods described in the present disclosure are provided by using exemplary sequences to present elements of the various steps, and are not limited to the particular presented sequence.

The particular operation herein described as performed by the base station apparatus 10 may in some instances be performed by its upper node. In a network of one or more network nodes having the base station apparatus 10, it will be apparent that various operations performed for communication with the user device 20 can be performed by at least one of the base station apparatus 10 and other network nodes other than the base station apparatus 10 (e.g., MME, S-GW, etc., but not limited thereto). Although the above description has illustrated that there is only one other network node other than the base station apparatus 10, the other network nodes may be a combination (e.g., MME and S-GW) of a plurality of other network nodes.

The information or signals described in this disclosure can be output from a higher layer (or lower layer) to a lower layer (or higher layer), and may be input and output through multiple network nodes.

Input and output information may be stored in a specific location (e.g., memory) or managed by using management tables. Input and output information may be overwritten, updated, or added. Output information may be deleted. The input information or the like may be transmitted to another device.

The determination in this disclosure may be made by a value (0 or 1) expressed in 1 bit, by a true or false value (Boolean: true or false), or by a numerical comparison (e.g., a comparison with a predetermined value).

Software, whether referred to as software, firmware, middleware, microcode, hardware description language, or any other name, should be broadly interpreted to mean instructions, sets of instructions, code, code segments, program code, programs, subprograms, software modules, applications, software applications, software packages, routines, subroutines, objects, executable files, executable threads, procedures, functions, and the like.

Software, instructions, information, and the like may also be transmitted/received via a transmission medium. For example, assuming that software is transmitted from a website, server, or other remote source by using at least one of wireline technology (such as coaxial cable, fiber optic cable, twisted pair, digital subscriber line (DSL), etc.) and wireless technology (infrared, microwave, etc.), at least one of these wireline technology and wireless technology is included within the definition of a transmission medium.

The information, signals and the like described in this disclosure may be represented by using any of a variety of different techniques. For example, data, instructions, commands, information, signals, bits, symbols, chips, etc., which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). Also, the signal may be a message. The component carrier (CC) may also be referred to as a carrier frequency, cell, frequency carrier, or the like.

The terms "system" and "network" as used in this disclosure are used interchangeably.

The information, parameters and the like described in the present disclosure may also be expressed by using absolute values, relative values from predetermined values, or may be expressed by using corresponding separate information. For example, radio resources may be those indicated by an index.

The names used for the parameters described above are not restrictive in any respect. In addition, the mathematical equations using these parameters may differ from those explicitly disclosed in this disclosure. Since the various channels (e.g., PUCCH, PDCCH, etc.) and information elements can be identified by any suitable name, the various names assigned to these various channels and information elements are not in any way limiting.

In this disclosure, the terms "Base Station (BS)", "wireless base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier" and the like may be used interchangeably. The base station may be referred to in terms such as macrocells, small cells, femtocells, picocells and the like.

The base station can accommodate one or more (e.g., three) cells. If the base station accommodates a plurality of cells, the entire coverage area of the base station can be divided into a plurality of smaller areas, each smaller area can also provide communication services by means of a base station subsystem (e.g., an indoor small base station (RRH: a Remote Radio Head). The term "cell" or "sector" refers to a portion or all of the coverage area of at least one of the base station and base station subsystem that provides communication services at the coverage.

In this disclosure, terms such as "mobile station (MS)", "user terminal", "user device (UE: user equipment)", "terminal" and the like may be used interchangeably.

The mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base station and the mobile station may be referred to as a transmission device, reception device, communication device, or the like. At least one of the base station and the mobile station may be a device mounted on the mobile body, a mobile body itself, or the like. The mobile body may be a vehicle (e.g., a car, airplane, etc.), an unmanned mobile body (e.g., a drone, automated vehicle, etc.), or a robot (manned or unmanned). At least one of the base station and the mobile station includes a device that does not necessarily move during communication operations. For example, at least one of the base station and the mobile station may be an IoT (Internet of Things) device such as a sensor.

In addition, the base station in the present disclosure may be read as the user terminal. For example, each aspect/embodiment of the present disclosure may be applied to a configuration in which communication between a base station and a user terminal is replaced by communication between multiple user devices 20 (e.g., what may be referred to as D2D (Device-to-Device), V2X (Vehicle-to-Everything), etc.). In this case, the user device 20 may be configured to have the function provided in the base station apparatus 10 described above. Also, the terms "uplink" and "downlink" may be replaced by the terms corresponding to terminal-to-terminal communication (e.g., "side"). For example, an uplink channel, a downlink channel, or the like may be read as a side channel.

Similarly, the user terminal in the present disclosure may be read as the base station. In this case, the base station may be configured to have the functions provided by the user terminal described above.

As used in this disclosure, the terms "determining" and "determining" may encompass a wide variety of operations. For example, "determining" and "decision" may include deeming matters such as judging, calculating, computing, processing, deriving, investigating, searching (looking up, search and inquiry) (e.g., searching in tables, databases, or other data structures), and ascertaining to be "determining" and "decision". Also, "determining" and "decision" may include deeming matters such as receiving (e.g., receiving information), transmitting (e.g., sending information), input, output, and accessing (e.g., accessing data in a memory) to be "determining" and "decision". Also, "determining" and "decision" may include deeming matters such as resolving, selecting, choosing, establishing, comparing, etc. to be "determining" and "decision". That is, the "determining" and the "decision" may include deeming some action to be "determining" and "decision". "Decision" may be read as "assuming", "expecting", "considering", etc.

The term "connected" or "coupled" or any variation thereof means any direct or indirect connection or coupling between two or more elements, and may include the presence of one or more intermediate elements between two elements "connected" or "coupled" with each other. The coupling or connection between the elements may be physical means, logical means, or a combination of these. For example, "connection" may be read as "access". As used in the present disclosure, the two elements may be thought of as being "connected" or "coupled" to each other by using at least one of the one or more wires, cables, and printed electrical connections and, as a number of non-limiting and non-inclusive examples, electromagnetic energy having wavelengths in the radio frequency region, the microwave region and the light (both visible and invisible) region.

The reference signal may be abbreviated as RS (Reference Signal) or may be referred to as a pilot, depending on the standards applied.

As used in this disclosure, the expression "based on" does not mean "solely based on" unless otherwise specified. In other words, the expression "based on" means both "solely based on" and "at least based on".

Even in use of any reference to an element using a designation such as "first" or "second" used in the present disclosure, this does not generally limit the amount or order of those elements. These designations can be used in the present disclosure as a convenient way to distinguish between two or more elements. Thus, references to the first and second elements do not imply that only two elements may be employed or that the first element must precede the second element in some way.

"Means" in the configuration of each of the above devices may be replaced by "parts", "circuits", "devices", etc.

When the terms "include", "including" and variations thereof are used in the present disclosure, these terms are intended to be comprehensive as well as the term "comprising". Furthermore, the term "or" as used in this disclosure is not intended to be an exclusive-OR.

A radio frame may consist of one or more frames in the time domain. Each frame or frames in the time domain may be referred to as subframes. The subframe may further comprise one or more slots in the time domain. The subframe may be a fixed length of time (e.g., 1 ms) independent of a numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, certain filtering processing performed by a transmitter/receiver in the frequency domain, and specific windowing processing performed by the transmitter/receiver in the time domain.

The slot may consist of one or more symbols (such as OFDM (Orthogonal Frequency Division Multiplexing) symbols, SC-FDMA (Single Carrier Frequency Division Multiple Access) symbols, and the like) in the time domain. The slot may be in time units based on a numerology.

The slots may include a plurality of minislots. Each minislot may be constituted by one or more symbols in the time domain. The minislot may also be referred to as a subslot. The minislots may consist of fewer symbols than the slots. A PDSCH (or PUSCH) transmitted in time units greater than a minislot may be referred to as a PDSCH (or PUSCH) mapping type A. PDSCH (or PUSCH) transmitted by using minislots may be referred to as PDSCH (or PUSCH) mapping type B.

Radio frames, subframes, slots, minislots and symbols all represent time units for transmitting signals. Radio frames, subframes, slots, minislots and symbols may be designated by separate terms corresponding thereto respectively.

For example, one subframe may be referred to as a Transmission Tine Interval (TTI). Multiple consecutive subframes may be referred to as a TTI. One slot or one minislot may be referred to as a TTI. That is, at least one of the subframes and the TTI may be a subframe (1 ms) in an existing LTE, a period shorter than 1 ms (e.g., 1-13 symbols), or a period longer than 1 ms. The unit representing the TTI may be referred to as a slot, a minislot or the like, in place of a subframe.

The TTI refers, for example, to the minimum time unit for scheduling in wireless communication. For example, in an LTE system, the TTI refers to scheduling of a base station for each user device 20 to allocate radio resources (such as frequency bandwidth, power for transmission, etc. usable in each user device 20) in TTI units. The definition of the TTI is not limited thereto.

The TTI may be a transmission time unit, such as a channel-encoded data packet (transport block), code block, codeword or the like, or may be a unit of a process, such as a scheduling or link adaptation. When a TTI is provided, a time section (e.g., the number of symbols) during which the transport block, code block, codeword or the like is actually mapped may be shorter than the TTI.

If one slot or one minislot is referred to as a TTI, one or more TTIs (i.e., one or more slots or one or more minislots) may be the minimum time unit for scheduling. The number of slots (minislots) constituting this minimum time unit of the scheduling may also be controlled.

A TTI having a time length of 1 ms may be referred to as a standard TTI (usually a TTI in LTE Rel. 8-12), a normal TTI, a long TTI, a normal subframe, a normal subframe, a long subframe, a slot, and the like. A TTI that is shorter than the standard TTI may be referred to as a shortened TTI, a short TTI, a partial TTI (partial or fractional TTI), a shortened subframe, a short subframe, a minislot, a subslot, a slot, or the like.

The long TTI (e.g., normal TTI, subframe, etc.) may be interpreted as a TTI having a time length over 1 ms. The short TTI (e.g., shortened TTI, etc.) may be interpreted as a TTI having a TTI length less than the TTI length of the long TTI and a TTI length equal to or greater than 1 ms.

Resource blocks (RBs) are resource allocation units for the time domain and frequency domain and may include one or more consecutive subcarrier waves (subcarriers) in the frequency domain. The number of subcarriers included in the RB may be the same, regardless of the numerology, and, for example, may be 12. The number of subcarriers included in the RB may be determined on the basis of numerology.

The time domain of the RB may also include one or more symbols, and may have a length of one slot, one minislot, one subframe or one TTI. One TTI, one subframe, etc., may each consist of one or more resource blocks.

It is noted that one or more RBs may be referred to as physical resource blocks (PRBs: physical RBs), subcarrier groups (SCGs), resource element groups (REGs), PRB pairs, RB pairs, and the like.

Also, resource blocks may also consist of one or more resource elements (RE). For example, one RE may be a radio resource area of one subcarrier and one symbol.

The bandwidth part (BWP) (which may also be referred to as a partial bandwidth, etc.) may represent a subset of consecutive common RBs (common resource blocks) for a certain numerology in a certain carrier. It is noted that the common RBs may be identified by an index of an RB relative to the common reference point of this carrier. A PRB is defined in a certain BWP and may be numbered within the same BWP.

A BWP may include a BWP for UL (UL BWP) and a BWP for DL (DL BWP). For a UE, one or more BWPs may be configured in one carrier.

At least one of the configured BWPs may be active, and the UE need not assume that it will transmit/receive predetermined signals/channels outside the active BWP. The terms "cell" and "carrier" in this disclosure may be read as "BWP".

Structures such as radio frames, subframes, slots, minislots, and symbols described above are only exemplary. For example, it is possible to vary the number of subframes included in a radio frame, the number of slots per subframe or radio frame, the number of minislots included in the slot, the number of symbols and RBs included in the slot or minislot, the number of subcarriers included in the RB, the number of symbols in the TTI, the symbol length, the length of the cyclic prefix (CP) length, and the like.

In the present disclosure, where an article is added by translation, for example a, an, and the in English, the disclosure may include that the noun following these articles is in a plural form.

In this disclosure, the words "A and B are different" may mean that "A and B are different from each other." Furthermore, those words may mean that "each of A and B is different from C". Terms such as "separated" or "combined" may be interpreted as well as "different".

The aspects/embodiments described in this disclosure may be used alone, in combination, or switched with implementation. Indication of given information (e.g. indication of "being X") may also be given not only explicitly but also implicitly (e.g. without indicating the given information).

In the present disclosure, the transmission unit 210 and the reception unit 220 are examples of communication units. MCG failure information is one example of information related to occurrence of a failure in a master cell group. The transmission unit 110 and the reception unit 120 are examples of communication units.

While the present disclosure has been described in detail above, it is apparent to those skilled in the art that the present disclosure is not limited to the embodiment described in the present disclosure. The disclosure may be implemented as modifications and variations without departing from the spirit and scope of the disclosure as defined by the claims. Accordingly, the description of the present disclosure is for illustrative purposes only and is not intended to have any restrictive meaning with respect to the present disclosure.

REFERENCE SIGNS LIST 10 base station apparatus
110 transmission unit
120 reception unit 130 configuration unit
140 control unit
20 user device
210 transmission unit
220 reception unit
230 configuration unit
240 control unit
1001 processor
1002 storage device
1003 auxiliary storage device
1004 communication device
1005 input device
1006 output device

The invention claimed is:

1. A terminal comprising:
a communication unit configured to perform communication to which dual connectivity is applied, wherein a master node and a secondary node are configured in the dual connectivity;
a control unit configured to detect occurrence of a failure in a cell associated with the master node;
a transmission unit configured to transmit information related to the occurrence of the failure in the cell associated with the master node to the master node via the secondary node; and
a reception unit configured to receive a Radio Resource Control (RRC) message from the master node via the secondary node,
wherein the control unit changes a primary cell to another cell of a Radio Access Technology (RAT) that is different from a RAT of the primary cell, by performing handover based on the RRC message,
wherein the information related to the occurrence of the failure in the cell associated with the master node includes information indicating a measurement result and information indicating a failure type,
wherein the RRC message relates to configuration of mobility from E-UTRA, and
wherein the measurement result includes a measResultFreqListNR, the measResultFreqListNR including a listing of best measured cells.

2. The terminal as claimed in claim 1, wherein the failure type includes at least:
expiration of a timer for detecting a failure of a physical layer of a primary cell,
a failure of random access,
exceeding a number of Radio Link Control (RLC) retransmissions, and
expiration of a timer for triggering a measurement report.

3. A base station comprising:
a communication unit configured to perform communication to which dual connectivity is applied, wherein a master node and a secondary node are configured in the dual connectivity;
a reception unit configured to receive information related to occurrence of a failure in a cell associated with the master node from a terminal; and
a transmission unit configured to transmit a Radio Resource Control (RRC) message including an instruction for changing a primary cell to another cell of a Radio Access Technology (RAT) that is different from a RAT of the primary cell, by performing handover based on the information related to the occurrence of the failure in the cell associated with the master node to the terminal via the secondary node,
wherein the information related to the occurrence of the failure in the cell associated with the master node includes information indicating a measurement result and information indicating a failure type,
wherein the RRC message relates to configuration of mobility from E-UTRA, and
wherein the measurement result includes a measResultFreqListNR, the measResultFreqListNR including a listing of best measured cells.

4. A communication system comprising:
a terminal; and
a base station,
wherein the terminal includes:
a communication unit configured to perform communication to which dual connectivity is applied, wherein a master node and a secondary node are configured in the dual connectivity;
a control unit configured to detect occurrence of a failure in a cell associated with the master node;
a transmission unit configured to transmit information related to the occurrence of the failure in the cell associated with the master node to the master node via the secondary node; and
a reception unit configured to receive a Radio Resource Control (RRC) message from the master node via the secondary node,
wherein the control unit changes a primary cell to another cell of a Radio Access Technology (RAT) that is different from a RAT of the primary cell, by performing handover based on the RRC message, and
wherein the RRC message relates to configuration of mobility from E-UTRA, and the base station includes:
a communication unit configured to perform communication to which dual connectivity is applied, wherein a master node and a secondary node are configured in the dual connectivity;
a reception unit configured to receive information related to occurrence of a failure in a cell associated with the master node from a terminal; and
a transmission unit configured to transmit a Radio Resource Control (RRC) message including an instruction for changing a primary cell to another cell of a Radio Access Technology (RAT) that is different from a RAT of the primary cell, by performing handover based on the information related to the occurrence of the failure in the cell associated with the master node to the terminal via the secondary node,
wherein the information related to the occurrence of the failure in the cell associated with the master node includes information indicating a measurement result and information indicating a failure type, and
wherein the measurement result includes a measResultFreqListNR, the measResultFreqListNR including a listing of best measured cells.

5. A communication method comprising:
by a terminal, performing communication to which dual connectivity is applied, wherein a master node and a secondary node are configured in the dual connectivity;
detecting occurrence of a failure in a cell associated with the master node;
transmitting information related to the occurrence of the failure in the cell associated with the master node to the master node via the secondary node;
receiving a Radio Resource Control (RRC) message from the master node via the secondary node; and changing a primary cell to another cell of a Radio Access Technology (RAT) that is different from a RAT of the primary cell, by performing handover based on the RRC message,
wherein the information related to the occurrence of the failure in the cell associated with the master node includes information indicating a measurement result and information indicating a failure type,
wherein the RRC message relates to configuration of mobility from E-UTRA, and
wherein the measurement result includes a measResultFreqListNR, the measResultFreqListNR including a listing of best measured cells.

* * * * *